US011132582B2

(12) United States Patent
Ishiyama et al.

(10) Patent No.: US 11,132,582 B2
(45) Date of Patent: Sep. 28, 2021

(54) INDIVIDUAL IDENTIFICATION DEVICE

(71) Applicant: NEC CORPORATION, Tokyo (JP)

(72) Inventors: Rui Ishiyama, Tokyo (JP); Toru Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/652,528

(22) PCT Filed: Sep. 5, 2018

(86) PCT No.: PCT/JP2018/032931
§ 371 (c)(1),
(2) Date: Mar. 31, 2020

(87) PCT Pub. No.: WO2019/069617
PCT Pub. Date: Apr. 11, 2019

(65) Prior Publication Data
US 2020/0242397 A1    Jul. 30, 2020

(30) Foreign Application Priority Data

Oct. 5, 2017    (JP) .............................. JP2017-194925

(51) Int. Cl.
*G06K 9/68* (2006.01)
*G06K 9/62* (2006.01)
*G06K 9/32* (2006.01)

(52) U.S. Cl.
CPC ......... *G06K 9/6215* (2013.01); *G06K 9/3233* (2013.01); *G06K 9/6232* (2013.01)

(58) Field of Classification Search
CPC .. G06K 9/6215; G06K 9/3233; G06K 9/6232; G06K 9/00442; G06K 9/4638; G06F 16/583; G06T 7/00
See application file for complete search history.

(56) References Cited

U.S. PATENT DOCUMENTS

2012/0243797 A1*   9/2012  Di Venuto Dayer .......................
                                                   G06K 9/3208
                                                   382/218
2017/0220895 A1*   8/2017  Matsushita .......... G06K 9/4671
(Continued)

FOREIGN PATENT DOCUMENTS

JP          8-255223 A     10/1996
JP          3235075 B2     12/2001
(Continued)

OTHER PUBLICATIONS

International Search Report dated Nov. 20, 2018 in International Application No. PCT/JP2018/032931.
(Continued)

*Primary Examiner* — Dhaval V Patel
(74) *Attorney, Agent, or Firm* — Sughrue Mion, PLLC

(57) ABSTRACT

When there is an image component common to multiple registered images, the accuracy of individual identification lowers. A decision unit decides, for each partial area, the degree of effectiveness relating to calculation of a score representing a similarity between a registered image obtained by capturing an object to be registered and a collated image obtained by capturing an object to be collated, based on whether or not the partial area contains an image component common to multiple registered images obtained by capturing multiple objects to be registered. A calculation unit calculates the score based on image components contained in the registered image and the collated image and on the degrees of effectiveness.

17 Claims, 35 Drawing Sheets

(56) References Cited

U.S. PATENT DOCUMENTS

2018/0129861 A1* 5/2018 Kim .................. G06K 9/00026
2018/0293739 A1* 10/2018 Gupta ................. G06K 9/4642

FOREIGN PATENT DOCUMENTS

| | | |
|---|---|---|
| JP | 3254622 B2 | 2/2002 |
| JP | 2004-185264 A | 7/2004 |
| JP | 2004-240931 A | 8/2004 |
| JP | 2007-534067 A | 11/2007 |
| JP | 2008-15848 A | 1/2008 |
| JP | 4337422 B2 | 9/2009 |
| JP | 4664147 B2 | 4/2011 |
| JP | 2013-196418 A | 9/2013 |
| JP | 5331721 B2 | 10/2013 |
| JP | 2014-142881 A | 8/2014 |
| JP | 2014-228940 A | 12/2014 |
| JP | 2017-84377 A | 5/2017 |
| JP | 6163868 B2 | 7/2017 |
| JP | 2017-138744 A | 8/2017 |
| WO | 2011/086889 A1 | 7/2011 |
| WO | 2014/163014 A1 | 10/2014 |

OTHER PUBLICATIONS

F. Berton G. Sandini and G. Metta, Anthropomorphic visual sensors, Jan. 1-16, 2006, Encyclopedia of Sensors vol. X Edited by C. A. Grimes E. C. Dickey and M. V. Pishko, USA.†

* cited by examiner
† cited by third party

FIG. 6

| SCORE OF SIMILARITY TO COLLATED IMAGE 6 (PRESENT INVENTION) | |
| --- | --- |
| REGISTERED IMAGE 4-1 | 0.96 |
| REGISTERED IMAGE 4-2 | 0.65 |
| REGISTERED IMAGE 4-3 | 0.17 |
| REGISTERED IMAGE 4-4 | 0.48 |

FIG. 7

| SCORE OF SIMILARITY TO COLLATED IMAGE 6 (CONVENTIONAL) | |
|---|---|
| REGISTERED IMAGE 4-1 | 0.98 |
| REGISTERED IMAGE 4-2 | 0.81 |
| REGISTERED IMAGE 4-3 | 0.78 |
| REGISTERED IMAGE 4-4 | 0.83 |

INDIVIDUAL IDENTIFICATION DEVICE

CROSS REFERENCE TO RELATED APPLICATIONS

This application is a National Stage of International Application No. PCT/JP2018/032931 filed Sep. 5, 2018, claiming priority based on Japanese Patent Application No. 2017-194925 filed Oct. 5, 2017, the disclosure of which is incorporated herein in its entirety by reference.

TECHNICAL FIELD

The present invention relates to an individual identification device, an individual identification method, and a program.

BACKGROUND ART

Collation between an image to be collated (hereinafter, referred to as a collated image) and a registered image is performed for individual identification, and various collation methods have been proposed or put into practical use.

For example, in Patent Document 1, firstly, a collated image and a registered image are transformed into a frequency domain using Fourier transform. Next, a cross power spectrum is calculated from the respective complex spectrums of the collated image and the registered image obtained by the abovementioned transformation. Next, a power component is eliminated from the cross power spectrum using a weighting filter for each frequency, and the cross power spectrum is normalized to only a phase component. Next, a correlation coefficient on an actual coordinate range is calculated using inverse Fourier transform on the normalized one. Next, pattern-matching judgment is performed using coordinates at which the calculated correlation coefficient has the maximum value.

Further, in Patent Document 2, firstly, Fourier transform is executed on a collated image to generate a collation Fourier image, and the collation Fourier image is synthesized with a registered image generated by executing the same process. Next, an amplitude suppression process is executed on the synthesized Fourier image, and then inverse Fourier transform is executed. Next, from a predetermined correlation component area appearing in the synthesized Fourier image on which inverse Fourier transform has been executed, top n pixels whose correlation component has a higher intensity are extracted, and it is determined whether or not the registered image and the collated image match based on the correlation component intensities of the extracted n pixels.

Further, Patent Document 3 describes an image processing method including a first step and a second step. The first step is calculating the degree of match between a collated image and a registered image. The second step is deciding the degree of effectiveness relating to calculation of the abovementioned degree of match by magnitude of the radius from the rotation center of at least one of the collated image and the registered image. In the first step, the degree of match is calculated based on pixel values of the collated image and the registered image and the degrees of effectiveness corresponding to the respective pixel values. Moreover, in Patent Document 3, the degree of effectiveness is embodied as a weight for the radius, and a method of deciding the weight in accordance with a frequency component is proposed as one of the methods for deciding the weight. To be specific, in an amplitude image on a frequency domain, a high-frequency component often represents a behavior of shot noise, and a low-frequency component often represents a behavior such as uneven illumination. In consideration of the above, a method of making the weight larger for an intermediate frequency band expected to include more information of a subject is described. Moreover, Patent Document 3 describes calculating the degree of match between the collated image and the registered image based on a partial image of a predetermined area by setting the degree of effectiveness to a value that is not used for calculating the degree of match (for example, the value is 0).

On the other hand, the following are known as other techniques relating to the present invention.

Patent Document 4 describes a feature point selection system that selects highly important feature points capable of reducing recognition errors in a recognition task, which is a process of recognizing an object shown in an image and the state of the object, from among multiple feature point candidates on a three-dimensional shape model and outputs the selected feature points.

Further, in Patent Document 14, based on a registered image including a specific image pattern and a fixed pattern noise and on a plain image including the fixed pattern noise but not including the specific image pattern, a frequency component of a fixed pattern noise unique to an imaging device commonly included in each of the registered image and the plain image, and a frequency component of the specific image pattern not including the fixed pattern noise are estimated and, based on the estimated frequency components, a weight relating to frequency at the time of calculating the correlation between the registered image and the collated image is controlled.

Patent Document 1: Japanese Unexamined Patent Application Publication JP-A 2008-015848
Patent Document 2: Japanese Patent Publication No. 3254622
Patent Document 3: Japanese Patent Publication No. 6163868
Patent Document 4: International Publication WO2011/086889
Patent Document 5: Japanese Patent Publication No. 4337422
Patent Document 6: International Publication WO2014/163014
Patent Document 7: Japanese Unexamined Patent Application Publication (Translation of PCT Application) JP-A 2007-534067
Patent Document 8: Japanese Unexamined Patent Application Publication JP-A 2013-196418
Patent Document 9: Japanese Patent Publication No. 3235075
Patent Document 10: Japanese Patent Publication No. 4664147
Patent Document 11: Japanese Unexamined Patent Application Publication JP-A 2014-142881
Patent Document 12: Japanese Unexamined Patent Application Publication JP-A 2004-240931
Patent Document 13: Japanese Unexamined Patent Application Publication JP-A 2014-228940
Patent Document 14: Japanese Patent Publication No. 5331721

In a case where there is an image component common to multiple registered images, when a collated image includes the same image component as described above, due to an influence of the common image component, a difference between a score indicating the similarity between a collated image and a registered image relating to the same individuals and a score indicating the similarity between a collated image and a registered image relating to different individuals is small. Consequently, the accuracy of individual identification lowers. Therefore, it can be conceived to apply the technique described in Patent Document 14 for reducing a decrease in collation accuracy due to a fixed pattern noise common to a registered image and a collated image. However, a fixed pattern noise common to multiple images discussed in Patent Document 14 is a fixed pattern noise unique to an imaging device, and is a kind of pattern that can be independently imaged as a plain image. However, as a pattern common to multiple images that adversely affects collation, there is a kind of pattern that cannot be independently imaged. For example, multiple images obtained by capturing the surfaces of objects produced using the same manufacturing apparatus each contain a pattern unique to the manufacturing apparatus other than a pattern unique to the object. The pattern unique to the manufacturing apparatus is a pattern common to multiple different images, and it is difficult to capture the pattern alone. In Patent Document 14, in order to decide a weight used at the time of collation, it is necessary to obtain an image in which only a pattern common to multiple images that adversely affects collation is shown. Therefore, according to the method described in Patent Document 14, in a case where a pattern common to multiple images is a pattern that cannot be captured alone, a weight cannot be set, and the accuracy of collation lowers.

SUMMARY

An object of the present invention is to provide an individual identification device which solves a problem that the accuracy of individual identification lowers when there is an image component common to multiple registered images.

An individual identification device according to an aspect of the present invention includes: a decision unit configured to decide, for each partial area, a degree of effectiveness relating to calculation of a score representing a similarity between a registered image obtained by capturing an object to be registered and a collated image obtained by capturing an object to be collated, based on whether or not the partial area contains an image component common to a plurality of registered images obtained by capturing a plurality of objects to be registered; and a calculation unit configured to calculate the score based on image components contained in the registered image and the collated image and on the degrees of effectiveness.

An individual identification method according to another aspect of the present invention includes: deciding, for each partial area, a degree of effectiveness relating to calculation of a score representing a similarity between a registered image obtained by capturing an object to be registered and a collated image obtained by capturing an object to be collated, based on whether or not the partial area contains an image component common to a plurality of registered images obtained by capturing a plurality of objects to be registered; and calculating the score based on image components contained in the registered image and the collated image and on the degrees of effectiveness.

A program according to another aspect of the present invention includes instructions for causing a computer to function as: a decision unit configured to decide, for each partial area, a degree of effectiveness relating to calculation of a score representing a similarity between a registered image obtained by capturing an object to be registered and a collated image obtained by capturing an object to be collated, based on whether or not the partial area contains an image component common to a plurality of registered images obtained by capturing a plurality of objects to be registered; and a calculation unit configured to calculate the score based on image components contained in the registered image and the collated image and on the degrees of effectiveness.

With the configurations described above, the present invention can prevent the accuracy of individual identification from lowering due to an image component common to multiple registered images.

BRIEF DESCRIPTION OF DRAWINGS

FIG. 6 is a view showing an example of a score indicating the similarity between the collated image and the registered image calculated by the individual identification device according to the first example embodiment of the present invention;

FIG. 7 is a view showing an example of a score calculated by comparing all the areas of the registered image and the collated image without considering the degree of effectiveness;

EXAMPLE EMBODIMENTS

Figure 1:
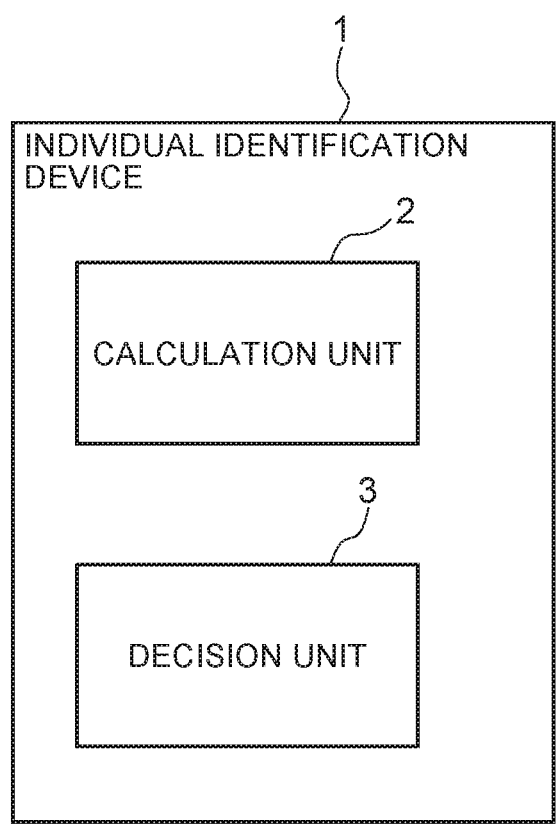
FIG. 1 is a block diagram of an individual identification device according to a first example embodiment of the present invention.

Next, an example embodiment of the present invention will be described in detail referring to the drawings.

First Example Embodiment

Referring to FIG. 1, an individual identification device 1 according to a first example embodiment of the present invention includes a calculation unit 2 and a decision unit 3. The calculation unit 2 is configured to calculate a score indicating the similarity between a registered image obtained by capturing an object to be registered and a collated image obtained by capturing an object to be collated. The decision unit 3 is configured to decide the degree of effectiveness relating to score calculation for each partial area based on whether or not it is a partial area containing an image component common to multiple registered images. The calculation unit 2 is configured to then calculate the abovementioned score based on image components contained in the registered image and the collated image and on the degree of effectiveness. Below, the configuration and operation of the individual identification device 1 will be described in detail using an example of an image simplified for convenience of explanation.

Figure 2:
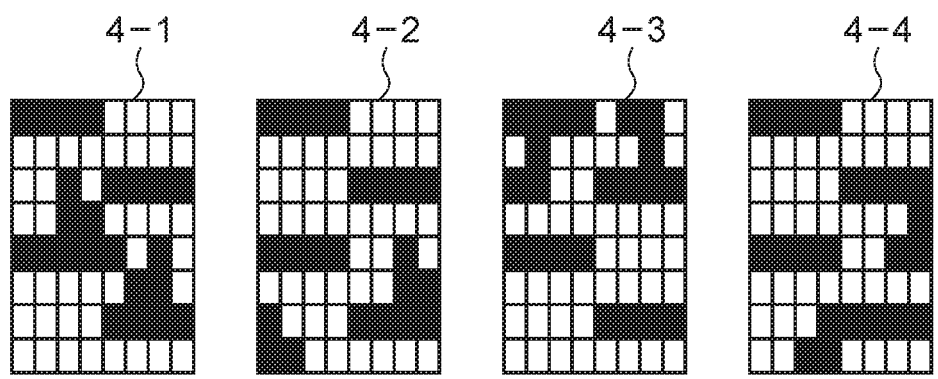
FIG. 2 is a view showing an example of a registered image that is an input in the individual identification device according to the first example embodiment of the present invention.

FIG. 2 shows examples of registered images, assuming there are four registered images in total. Each registered image 4 is composed of n×m (n=m=8 in the illustrated example) partial areas. Hereinafter, partial area (i, j) represents a partial area on the $i^{th}$ row and the $j^{th}$ column. Partial area (i, j) may be, for example, any of the following.

(a) Each of the divided areas obtained by dividing a monochrome image or a color image obtained by capturing an object with a camera into n×m pieces.

(b) Each of the divided areas obtained by dividing a frequency spectrum image, which is obtained by executing frequency transformation such as Fourier transform on a monochrome image or a color image obtained by capturing an object with a camera, into n×m pieces. The frequency spectrum image is invariant to the parallel movement of the captured image.

(c) Each of the divided areas obtained by dividing a polar coordinate image into n×m pieces. The polar coordinate image can be obtained by firstly transforming a monochrome image or a color image obtained by capturing an object with a camera into a frequency spectrum image by executing frequency transformation such as Fourier transform, and subsequently executing polar coordinate transformation or log-polar transformation on the frequency spectrum image. The polar coordinate image is referred to as a Fourier-Mellin feature image. Changes in magnification and rotation of the captured image are transformed into changes in parallel movement in the Fourier-Mellin feature image.

(d) Each of the divided areas obtained by dividing a phase image into n×m pieces. The phase image can be obtained by firstly transforming a monochrome image or a color image obtained by capturing an object with a camera into a frequency spectrum image by executing frequency transformation such as Fourier transform, subsequently transforming the frequency spectrum image into a Fourier-Mellin feature by executing polar coordinate transformation or log-polar transformation, and furthermore executing frequency transformation such as Fourier transform on the Fourier-Mellin feature. The phase image is referred to as a Fourier-Mellin frequency spectrum image. The Fourier-Mellin frequency spectrum image is invariant to the magnification, rotation, and parallel movement of the captured image.

In general, an image component of partial area (i, j) takes various values depending on (a) to (d) described above. However, in FIG. 2, the value of partial area (i, j) is binary for convenience of explanation. That is, in FIG. 2, partial area (i, j) colored in black represents that the value of the image component is a certain value (hereinafter, referred to as P). Partial area (i, j) colored in white represents that the value of the image component is another value (hereinafter, referred to as Q).

The decision unit 3 determines that the degree of effectiveness relating to score calculation of a partial area containing an image component common to all the registered images 4 is low and, on the contrary, the degree of effectiveness relating to score calculation of a partial area containing an image component which is not common to all the registered images 4 is high. Referring to FIG. 2, the image component of partial area (1, 1) has the same value P in all the registered images. Therefore, the decision unit 3 determines that the degree of effectiveness relating to score calculation of partial area (1, 1) is low. On the other hand, the value of the image component of partial area (1, 6) is Q in the registered images 4-1, 4-2, and 4-4, but the value is P in the registered image 4-3. That is, the value is not the same in all the registered images. Therefore, the decision unit 3 determines that the degree of effectiveness relating to score calculation of partial area (1, 6) is high. The decision unit 3 thus decides the degree of effectiveness relating to score calculation for each partial area.

Figure 3:
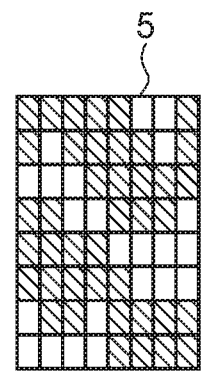
FIG. 3 is a view showing an example of the degree of effectiveness relating to score calculation decided in the individual identification device according to the first example embodiment of the present invention.

FIG. 3 illustrates an effectiveness degree 5 relating to score calculation for each partial area decided by the decision unit 3. In FIG. 3, a hatched partial area represents that the degree of effectiveness relating to score calculation is low, and a white partial area represents that the degree of effectiveness relating to score calculation is high. The degree of effectiveness takes, for example, a value from 0 to 1, and the level of effectivity decreases as the value gets close to 0. A partial area whose degree of effectiveness is 0 is equivalent to a partial area not used for score calculation. A partial area whose degree of effectiveness is 1 is equivalent to a partial area used 100% for score calculation. Hereinafter, in FIG. 3, the degree of effectiveness of the hatched partial area is 0, and the degree of effectiveness of the white partial area is 1. In this case, there are a total of 23 white partial areas in FIG. 3, so that the calculation unit 2 calculates the score using the 23 partial areas out of the 8×8 partial areas.

Figure 4:
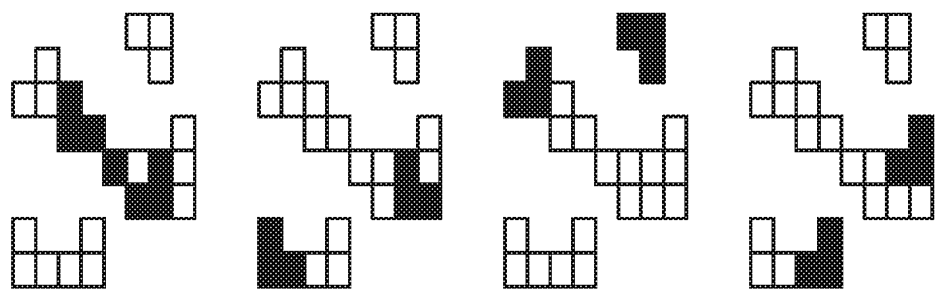
FIG. 4 is a view showing a partial image of the registered image used when the individual identification device according to the first example embodiment of the present invention calculates a score.
Figure 5:
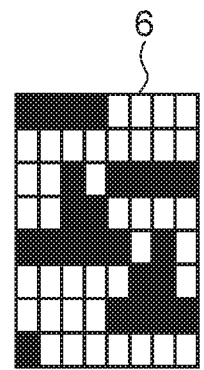
FIG. 5 is a view showing an example of a collated image that is an input in the individual identification device according to the first example embodiment of the present invention.

FIG. 4 shows a partial image composed of the 23 partial areas of each of the registered images 4-1 to 4-4 used when the calculation unit 2 calculates the score. FIG. 5 shows an example of a collated image 6 obtained by capturing an object to be collated. The collated image 6 in this example is assumed to be an image obtained by capturing the same object as in the registered image 4-1. However, in the collated image 6, the image component of partial area (8, 1) has changed from the original value Q to the value P because of an influence of noise or the like.

The score calculated by the calculation unit 2 may be any score as long as it indicates the similarity between the registered image 4 and the collated image 6. Herein, for convenience of explanation, the score is calculated by a method of, for each partial area of the registered image 4, comparing image components between the partial area of the registered image 4 and the corresponding partial area of the collated image 6 and, if the image components are the same, adding values each obtained by multiplying a point 1 by the degree of effectiveness. According to this calculation method, the score of the similarity between each of the registered images 4-1 to 4-4 and the collated image 6 is as shown in FIG. 6. That is, between the registered image 4-1 and the collated image 6, image components of 22 partial areas among the 23 partial areas whose degree of effectiveness is 1 match each other, so that the score of the similarity is 22/23=0.96. Between the registered image 4-2 and the collated image 6, image components of 15 partial areas among the 23 partial areas whose degree of effectiveness is 1 match each other, so that the score of the similarity is 15/23=0.65. Likewise, the score of the similarity between the registered image 4-3 and the collated image 6 is 0.17, and the score of the similarity between the registered image 4-4 and the collated image 6 is 0.48. Since the collated image 6 is assumed to be an image obtained by capturing the same object as the registered image 4-1, it is natural that the score of the similarity with the registered image 4-1 is the highest. It should be noted, however, that a difference from the second-place and lower-place scores is significant. Therefore, the first-place score can be easily distinguished from the second-place and lower-place scores, and individual identification robust to noise or the like can be realized.

On the other hand, when the score of the similarity between each of the registered images 4-1 to 4-4 and the collated image 6 is calculated for all the areas of the registered image and the collated image without considering the degree of effectiveness, the result is as shown in FIG. 7. That is, between the registered image 4-1 and the collated image 6, image components of 63 partial areas of the 8×8 partial areas match each other, so that the score of the similarity is 63/64=0.98. Between the registered image 4-2 and the collated image 6, image components of 52 partial areas match each other, the score of the similarity is 52/64=0.81. likewise, the score of the similarity between the registered image 4-3 and the collated image 6 is 0.78, and the score of the similarity between the registered image 4-4 and the collated image 6 is 0.83. Since the collated image 6 is assumed to be an image obtained by capturing the same object as in the registered image 4-1, the score of the similarity with the registered image 4-1 is the highest. However, the second-place and lower-place scores also tend to be high, so that the difference from the first-place score is slight in contrast to FIG. 6. Therefore, it is difficult to distinguish the first-place score from the second-place or lower-place scores, and the accuracy of individual identification is low.

Next, the calculation unit 2 will be described in more detail.

Figure 8:
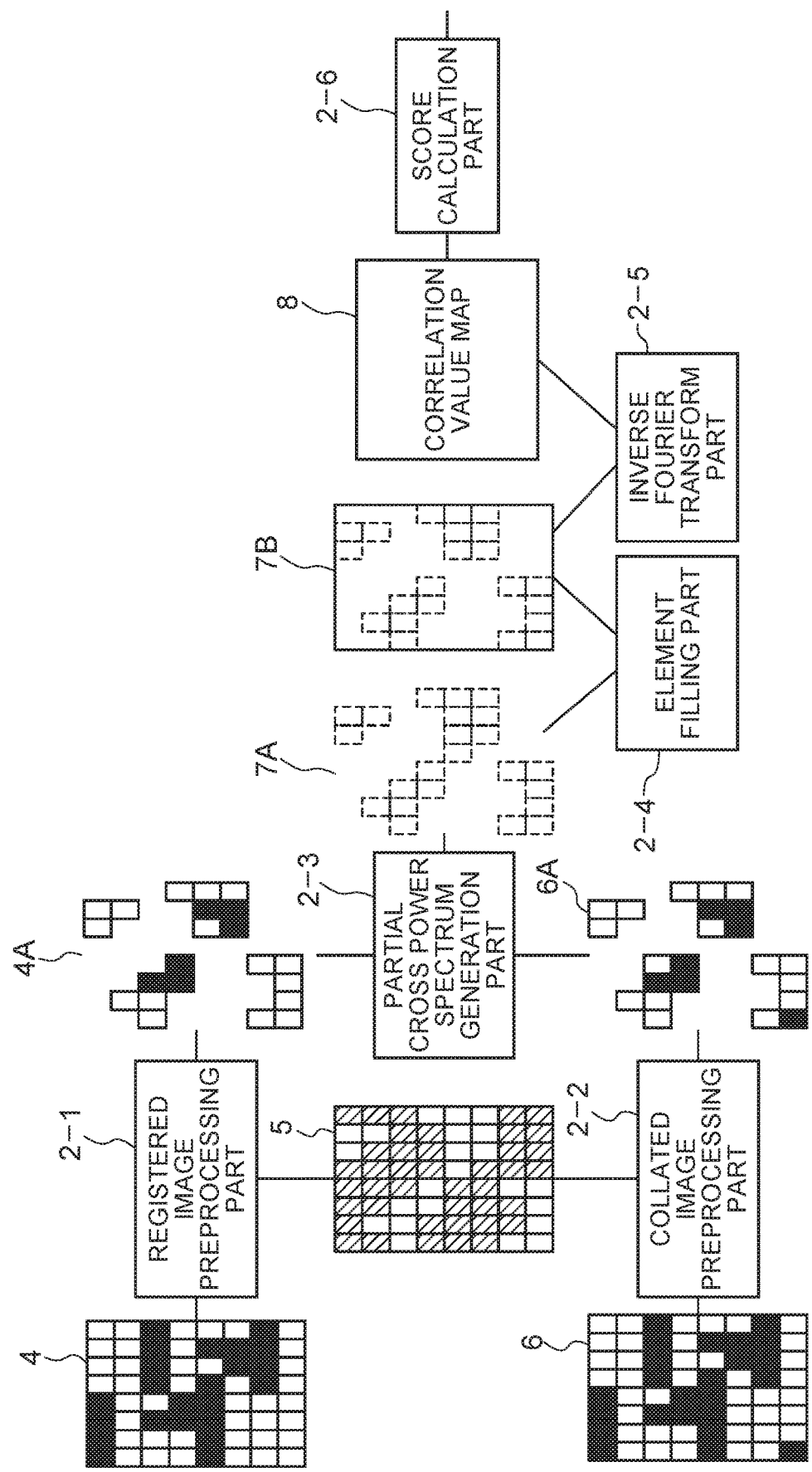
FIG. 8 is a block diagram showing an example of the configuration of a calculation unit in the individual identification device according to the first example embodiment of the present invention.

FIG. 8 shows an example of the configuration of the calculation unit 2. The calculation unit 2 of this example includes a registered image preprocessing part 2-1, a collated image preprocessing part 2-2, a partial cross power spectrum generation part 2-3, an element filling part 2-4, an inverse Fourier transform part 2-5, and a score calculation part 2-6.

The registered image preprocessing part 2-1 is configured to generate a registered image partial image 4A composed of only partial areas whose degrees of effectiveness are equal to or more than a threshold value based on the registered image 4 and the effectiveness degrees 5. By setting the threshold value to, for example, 1 or a value close to 1, it is possible to extract, from the registered image 4, partial areas remaining after eliminating partial areas including image components common to all the registered images 4.

The collated image preprocessing part 2-2 is configured to generate a collated image partial image 6A composed of only partial areas whose degrees of effectiveness are equal to or more than the abovementioned threshold value based on the collated image 6 and the effectiveness degrees 5. Therefore, by setting the threshold value to, for example, 1 or a value close to 1, it is possible to extract, from the collated image 6, partial areas remaining after eliminating partial areas including image components common to all the registered images 4.

The partial cross power spectrum generation part 2-3 is configured to calculate a partial cross power spectrum 7A between the registered image partial image 4A and the collated image partial image 6A. For example, the partial cross power spectrum generation part 2-3 may be configured to generate a cross power spectrum by corresponding partial area in the partial image 4A and the partial image 6A, or may be configured to collectively generate a crow power spectrum by area composed of two or more neighboring partial areas.

The element filling part 2-4 is configured to generate an entire cross power spectrum 7B by filling zero as a cross power spectrum of a partial area other than the partial areas requiring a cross power spectrum in the cross power spectrum 7A. The inverse Fourier transform part 2-5 is configured to execute inverse Fourier transform on the cross power spectrum 7B and calculate a correlation value map 8. The score calculation part 2-6 is configured to calculate a score indicating the similarity between the registered image 4 and the collated image 6 based on the presence/absence of a peak on the correlation value map 8 and a value indicating the sharpness of the peak. The presence/absence of the peak can be judged, for example, based on whether there is a peak exceeding a judgment value previously calculated. As the value indicating the sharpness of the peak, for example, it is possible to use the difference between the maximum peak and the judgment threshold value, the ratio of the maximum peak to the second-place peak, and so on.

Figure 9:
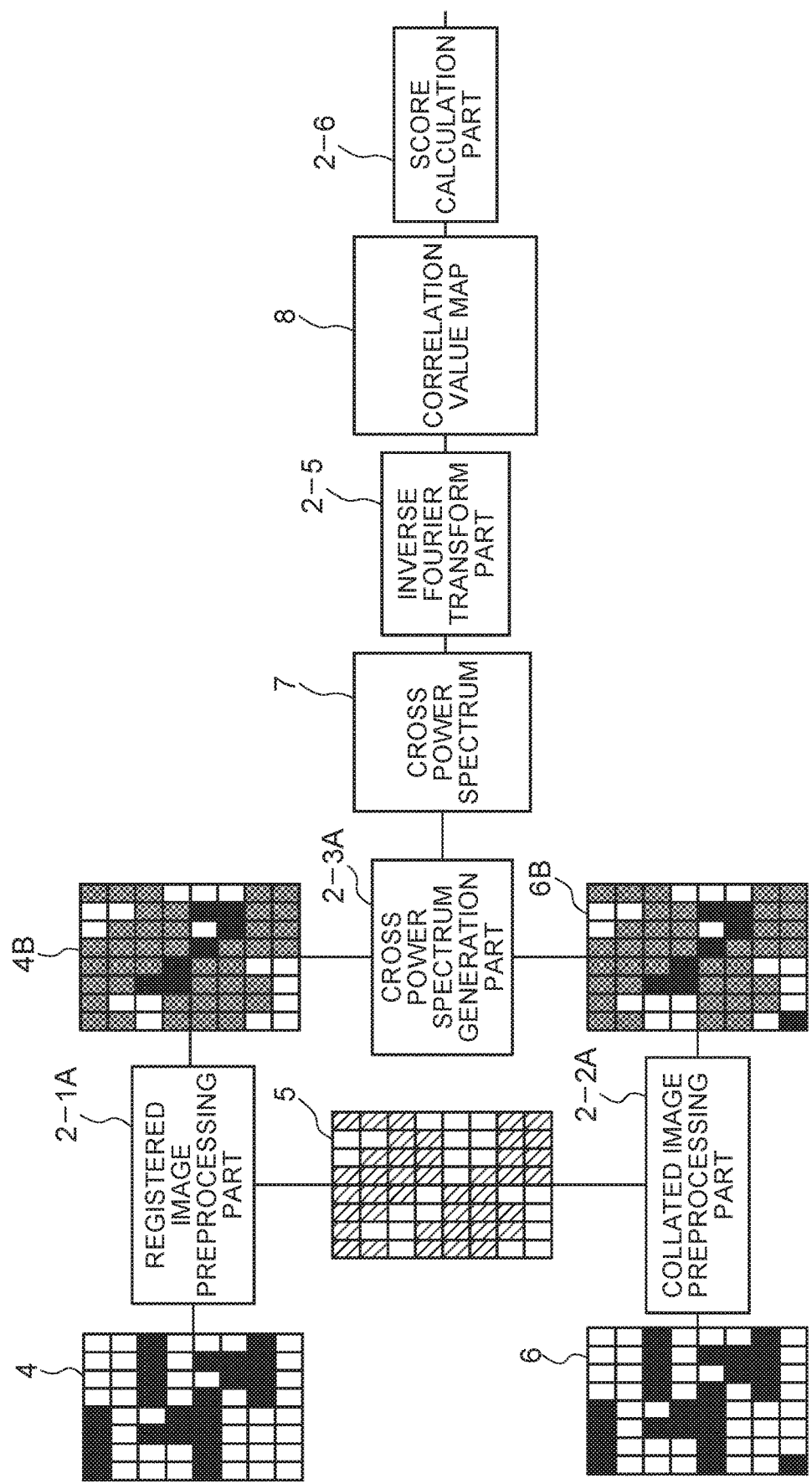
FIG. 9 is a block diagram showing another example of the configuration of the calculation unit in the individual identification device according to the first example embodiment of the present invention.

FIG. 9 shows another example of the configuration of the calculation unit 2. The calculation unit 2 of this example includes a registered image preprocessing part 2-1A, a collated image preprocessing part 2-2A, a cross power spectrum generation part 2-3A, the inverse Fourier transform part 2-5, and the score calculation part 2-6.

The registered image preprocessing part 2-1A is configured to generate a post-change registered image 4B obtained by changing the value of the image component of a partial area in the registered image 4 in accordance with the effectiveness degree 5 of the partial area, based on the registered image 4 and the effectiveness degrees 5. For example, the registered image preprocessing part 2-1A sets a value obtained by multiplying the value of the image component of a partial area in the registered image 4 by the effectiveness degree 5, as the image component of the partial area in the post-change registered image 4B. In this case, the image component of a partial area whose effectiveness degree 5 is 0 becomes zero. However, the method is not limited to the above one, and may be any other method as long as the image component can be changed in accordance with the degree of effectiveness. For example, it may be a method of adding a value corresponding to the degree of effectiveness to the image component. Since the value of the image component in the post-change registered image 4B is smaller as the degree of effectiveness is smaller, such an image component is not emphasized in calculation of the similarity.

The collated image preprocessing part 2-2A is configured to, by the same method as in the registered image preprocessing part 2-1A, generate a post-change collated image 6B obtained by changing the value of the image component of a partial area in the collated image 6 in accordance with the effectiveness degree 5 of the partial area, based on the collated image 6 and the effectiveness degrees 5.

The cross power spectrum generation part 2-3A is configured to generate a cross power spectrum 7 between the post-change registered image 4B and the post-change collated image 6B. The inverse Fourier transform part 2-5 is configured to execute inverse Fourier transform on the cross power spectrum 7 and calculate the correlation value map 8. The score calculation part 2-6 is configured to calculate a score indicating the similarity between the registered image 4 and the collated image 6 based on the presence/absence of a peak on the correlation value map 8 and a value indicating the sharpness of the peak.

Next, the decision unit 3 will be described in more detail.

Figure 10A:
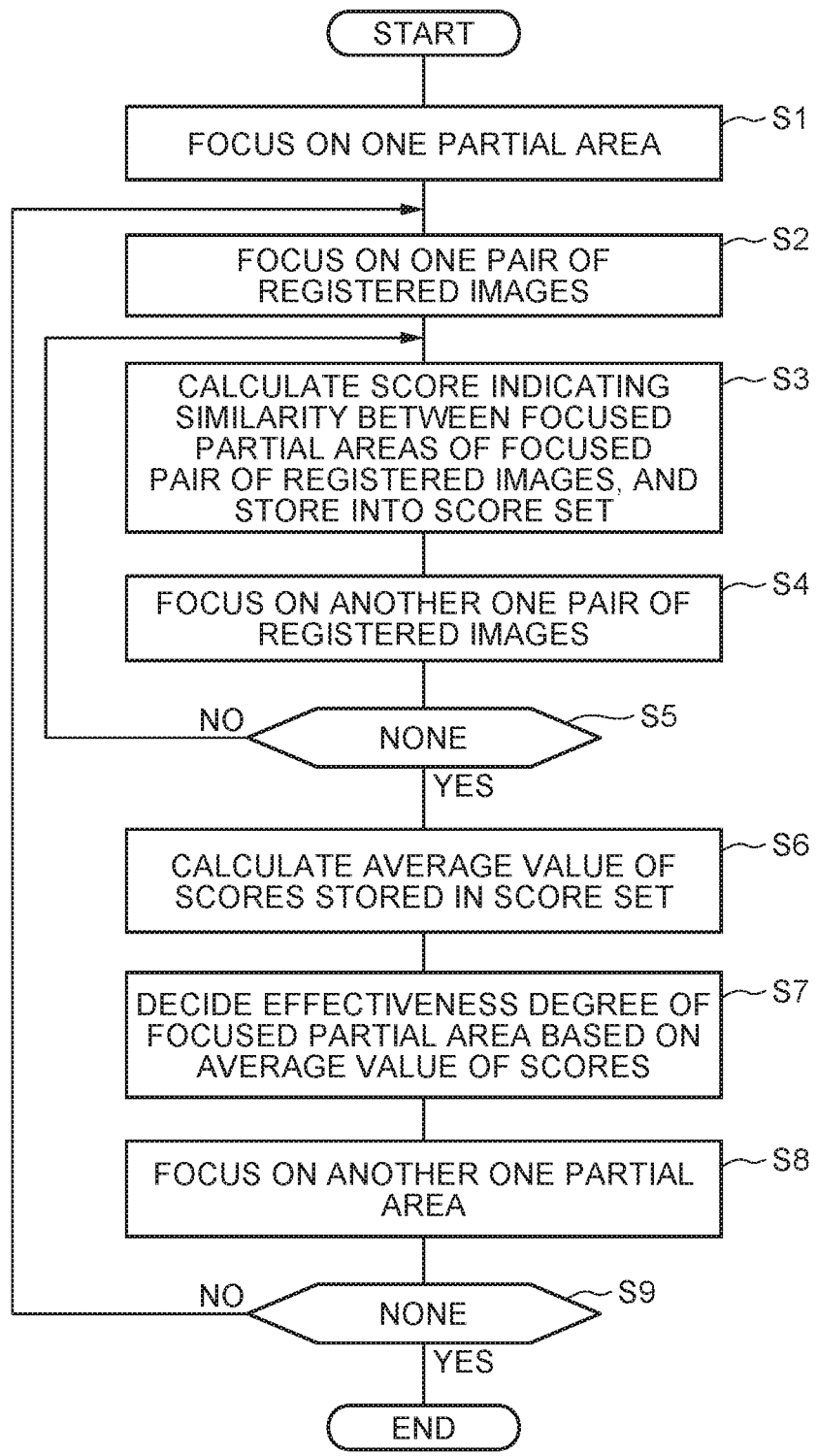
FIG. 10A is a flowchart showing an example of processing by a decision unit in the individual identification device according to the first example embodiment of the present invention.

FIG. 10A is a flowchart showing an example of processing by the decision unit 3. The decision unit 3 firstly focuses on one partial area (for example, partial area (1, 1)) (step S1). Next, the decision unit 3 focuses on one pair of registered images (for example, the pair of the registered image 4-1 and the registered image 4-2) (step S2). Next, the decision unit 3 calculates a score indicating the similarity between the focused partial areas of the focused pair of registered images, and stores the score into a score set (step S3). For example, the decision unit 3 uses the partial cross power spectrum generation unit 2-3 of FIG. 8 to generate a partial cross power spectrum between the partial area of one of the pair and the partial area of the other, subsequently uses the element filling part 2-4 to generate an entire cross power spectrum by filling zero into the remaining partial areas, subsequently uses the inverse Fourier transform part 2-5 to generate a correlation value map from the entire cross power spectrum, subsequently uses the score calculation part 2-6 to calculate a score from the correlation value map 8, and then determines the calculated score as a score indicating the similarity between the focused partial areas of the focused pair of registered images. The score may be calculated by the method shown in FIG. 9 instead of the method shown in FIG. 8.

Next, the decision unit 3 focuses on the next one pair of registered images (the registered image 4-1 and the registered image 4-3) (step S4). Then, the decision unit 3 returns to step S3 to execute the same processing as the abovementioned processing again. In a case where the decision unit 3 has already focused on all the pairs of registered images (YES at step S5), the decision unit 3 calculates the average value of the scores stored in the score set (step S6). Next, the decision unit 3 decides the degree of effectiveness of the focused partial area based on the average value of the scores (step S7). For example, the decision unit 3 sets the degree of effectiveness of the focused partial area to 0 if the average value of the scores is more than a preset threshold value a, and sets the degree of effectiveness of the focused partial area to 1 if not. Consequently, the degree of effectiveness of a partial area having large contribution to occurrence of a correlation peak between different individuals is low, and the degree of effectiveness of a partial area having small contribution to occurrence of a correlation peak between different individuals is high.

Next, the decision unit 3 focuses on another one partial area (step S8). Then, the decision unit 3 returns to step S2 to execute the same processing as the abovementioned processing again. In a case where the decision unit 3 has already focused on all the partial areas (YES at step S9), the decision unit 3 ends the processing shown in FIG. 10A.

Thus, according to the processing shown in FIG. 10A, the decision unit 3 decides the degree of effectiveness so as to be low in a partial area having large contribution to occurrence of a correlation peak between different individuals and be high in a partial area having small contribution to occurrence of a correlation peak between different individuals.

Figure 10B:
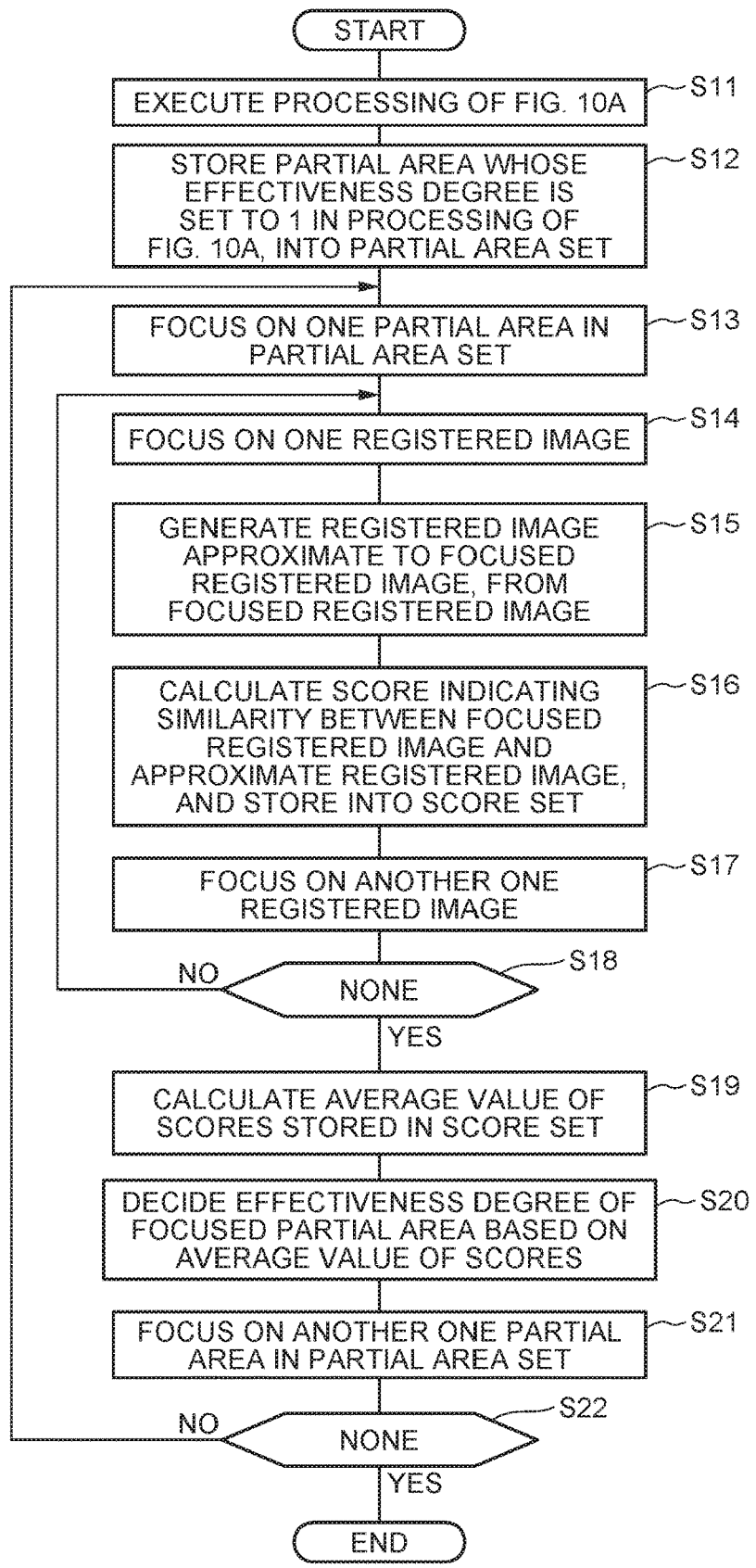
FIG. 10B is a flowchart showing another example of processing by the decision unit in the individual identification device according to the first example embodiment of the present invention.

FIG. 10B is a flowchart showing another example of processing by the decision unit 3. The decision unit 3 firstly executes the same processing as shown in FIG. 10A to decide the degree of effectiveness of each partial area based on the correlation value between different registered images (step S11). Next, the decision unit 3 stores a partial area whose degree of effectiveness decided at step S11 is equal to or more than a certain value into a partial area set (step S12). For example, the decision unit 3 stores a partial area whose degree of effectiveness has been set to 1 based on the correlation value between difference registered images into the partial area set.

Next, the decision unit 3 focuses on one partial area in the partial area set (step S13). Next, the decision unit 3 focuses on one registered image (step S14). Next, the decision unit 3 generates a registered image approximate to the focused registered image based on the focused registered image (step S15). The decision unit 3 may regard an image obtained by giving noise or geometric transformation to the focused registered image as a registered image approximate to the registered image. Next, the decision unit 3 calculates a score indicating the similarity between the focused registered image and the approximate registered image, for example, by the method shown in FIG. 8 or the method shown in FIG. 9, and stores the calculated score into a score set (step S16). Next, the decision unit 3 focuses on another one registered image (step S17). Then, the decision unit 3 returns to step S15 to execute the same processing as the abovementioned processing again. In a case where the decision unit 3 has already focused on all the registered images (YES at step S18), the decision unit 3 calculates the average value of the scores stored in the score set (step S19). Next, the decision unit 3 decides the degree of effectiveness of the focused partial area based on the average value of the scores (step S20). For example, the decision unit 3 sets the degree of effectiveness of the focused partial area to 1 if the average value of the scores is more than a preset threshold value β, and sets the degree of effectiveness of the focused partial area to 0 if not. Consequently, the degree of effectiveness of a partial area having large contribution to occurrence of a correlation peak between the same individuals is high, and the degree of effectiveness of a partial area having small contribution to occurrence of a correlation peak between the same individuals is high.

Next, the decision unit 3 focuses on another one partial area in the partial area set (step S21). Next, the decision unit 3 returns to step S14 to execute the same processing as the abovementioned processing again. In a case where the decision unit 3 has already focused on all the partial areas (YES at step S22), the decision unit 3 ends the processing shown in FIG. 10B.

Thus, according to the processing shown in FIG. 10B, the decision unit 3 decides the degree of effectiveness so as to be high in a partial area having large contribution to occurrence of a correlation peak between the same individuals and be low in a partial area having small contribution to occurrence of a correlation peak between the same individuals.

<Decision of Judgment Threshold Value>

Next, a method will be described by which the individual identification device 1 decides a threshold value for judging that a collated image is none of plural registered images (hereinafter, the threshold value will be referred to as a judgment threshold value) based on multiple scores indicating the similarities between the collated image and the multiple registered images.

Figure 11:
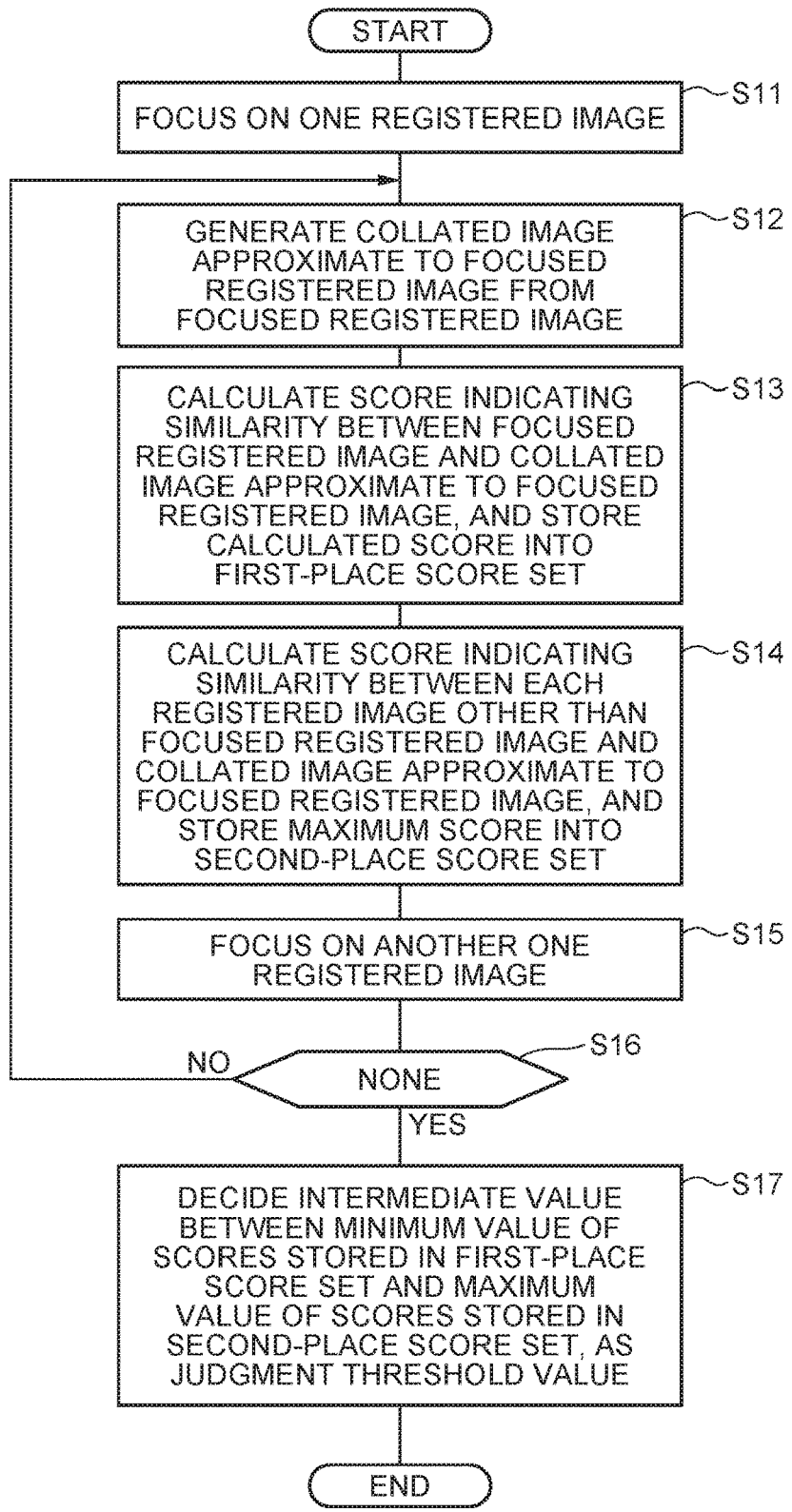
FIG. 11 is a flowchart showing an example of a process of deciding a judgment threshold value in the individual identification device according to the first example embodiment of the present invention.

FIG. 11 is a flowchart showing an example of a process for the individual identification device 1 to decide the judgment threshold value. This process is executed by a threshold value decision unit 9 included by the individual identification device 1. The threshold value decision unit 9 is configured to execute the process shown in FIG. 11 at a time when multiple registered images 4 are registered in a database (not shown). The threshold value decision unit 9 may be configured to thereafter execute the process shown in FIG. 11 again at a time when one or more new registered images 4 are additionally registered into the database.

The threshold value decision unit 9 focuses on one registered image registered in the database (not shown) (step S11), and generates a collated image approximate to the focused registered image based on the focused registered image (step S12). The threshold value decision unit 9 may regard the focused registered image as a collated image. Alternatively, the threshold value decision unit 9 may regard an image obtained by giving noise or geometric transformation to the focused registered image as a collated image. Next, the threshold value decision unit 9 calculates a score indicating the similarity between the focused registered image and the collated image by the method shown in FIG. 8 or the method shown in FIG. 9, and stores the calculated score into a first-place score set (step S13). Next, the threshold value decision unit 9 calculates scores indicating the similarities between all the registered images other than the focused registered image and the collated image by the method shown in FIG. 8 or the method shown in FIG. 9, and stores the maximum score of the calculated scores into a second-place score set (step S14). Next, the threshold value decision unit 9 focuses on another one registered image registered in the database (steps S15 and S16), and returns to step S12 to execute the same process as the abovementioned process again.

When finished executing the above-described process on all the registered images, the threshold value decision unit 9 decides an intermediate value between the minimum value of the scores stored in the first-place score set and the maximum value of the scores stored in the second-place score set, as the judgment threshold value (step S17). As another example, the threshold value decision unit 9 may decide an intermediate value between the average value of the scores stored in the first-place score set and the average value of the scores stored in the second-place score set, as the judgment threshold value.

As described above, according to this example embodiment, it is possible to prevent decrease of the accuracy of individual identification due to an image component common to multiple registered images. This is because the decision unit 3 is configured to decide the degree of effectiveness relating to calculation of a score indicating the similarity between a registered image and a collated image obtained by capturing an object to be collated, for each partial area, based on whether or not the partial area includes an image component common to multiple registered images obtained by capturing multiple objects to be registered exists, and because the calculation unit 2 is configured to calculate the score based on the image component included in the registered image and the collated image and on the degree of effectiveness.

Second Example Embodiment

Next, a second example embodiment of the present invention will be described.
<Background Art>
Conventionally, quality management and distribution management for individual products are performed by giving serial numbers, barcodes, QR codes, or the like to objects such as industrial products and commercial products. Moreover, there is a technique of giving IC tags or RFIDs to individual products and efficiently realizing, by a wireless communication method, total management of the products from manufacture to logistics and sales of the products and prevention of loss, theft, or forgery of the products.

However, in the product individual management method using serial numbers, barcodes, QR codes, IC tags, or RFID tags described above, there is a need to give them to the respective products. Thus, there is a problem that the cost becomes enormous in proportion to the production volume of products.

Further, for some products, for example, physically small metal parts and resin parts such as screws and bolts, it is often impossible to directly enter serial numbers or barcodes or to attach the abovementioned tags. Besides, even if a product can be physically provided with a barcode or the like or provided with a tag, there is a problem that providing the product with the barcode, the tag or the like impairs the appearance and design of the product.

Therefore, the following methods have been proposed. In the methods, identification and management of each product is performed by acquiring a minute difference naturally caused in a single manufacturing process, such as fine irregularities and patterns on the product surface or random pattern on the material surface, as an image by using an image capturing device such as a camera, and recognizing the captured image.

For example, Patent Document 5 describes an item management device using a captured image obtained by an image capturing device that captures an image of a random pattern on the product surface in a protective film attachment portion that is a specific portion on the product surface where a protective film is attached.

Further, Patent Document 6 describes a product identification unit using an image feature of a satin-finished pattern included in a captured image obtained by a camera that captures an image of a satin finish formed on the surface of a part or a product.

Further, Patent Documents 7 and 8 describe a method for authenticity judgment of an item using a random pattern of taggants (fine particles) on the item for the purpose of individual identification and item authentication judgment.

Further, as a similar technique, there is a biometric authentication technology for personal authentication using a pattern such as a human fingerprint, iris, or palm print. In general, by designing feature values in accordance with imaging targets such as a fingerprint and an iris and calculating the similarity between the feature values, individual (personal) identification or authentication is performed. However, there is also a method for individual (personal) identification or authentication using a general-purpose image matching method. For example, Patent Document 9 proposes a method in which two-dimensional Fourier transform is executed on a captured image of a human fingerprint and individual (personal) identification or authentication is performed using a phase-only correlation of the captured image. Patent Document 10 proposes a method for individual (personal) identification or authentication using a phase-only correlation for a captured image of an iris.

Further, Patent Document 11 describes an image transformation device that, for the purpose of personal authentication, executes frequency transformation and polar coordinate transformation on an image showing a subject, selects a frequency band representing the feature of the subject from a frequency spectrum image represented by the polar coordinate system, and generates a vector for individual identification containing an element specifying the selected frequency band and an element representing the frequency spectrum. Moreover, in Patent Document 11, at the time of collation, a rotation angle and an misalignment due to change of the direction of the subject at every reading of biometric information are coped with by changing the combination of a direction on an input feature information vector and a direction on a registered feature information vector and calculating the sum of the distances between the two vectors.

Further, Patent Document 12 describes an image collation device that can perform collation even when there is a difference in parallel movement amount, rotation angle, or magnification/reduction between a collated image and a registered image. To be specific, according to Patent Document 12, firstly, Fourier transform (FFT) and log-polar coordinate transformation (LPT) are executed on a collated image and a registered image, and correction information (magnification information, rotation information) of the collated image with respect to the registered image is generated by phase-only correlation between frequency spectrum images of the collated image and the registered image obtained by the above transformations. Next, correction of the magnification and rotation of the collated image is performed based on the correction information, and collation is performed by executing a correlation process of the collated image and the registered image after the correction.

Further, Patent Document 13 describes an image processing device that can more accurately obtain the degree of misalignment between a referred image and a fiducial image obtained by capturing the same object in different positions and poses. In Patent Document 13, as in Patent Document 12, a frequency spectrum (Fourier-Mellin (FM)) image is obtained by executing Fourier transform and log-polar coordinate transformation on a collated image and a registered image. Then, the degree of misalignment (magnification information, rotation information, and so on) of the collated image with respect to the registered image is generated using a phase-only correlation process between the FM images of the collated image and the registered image. At this time, in Patent Document 13, a correlation is calculated by weighting so as to exclude an area having a large radius in the FM images, such as an area that is not included in one of the referred image and the fiducial image due to misalignment between the images or an area in which a correlation decreases due to decrease of the number of sample points in polar coordinate transformation. As a result, the degree of misalignment is accurately estimated. Moreover, even when there is an illumination change between the collated image and the registered image, the degree of misalignment is estimated so as to be robust to the illumination change by increasing the weight for an intermediate frequency band supposed to contain more information on the subject. Moreover, the position is more accurately estimated by setting a weight so as to emphasize the edge feature of an image, which is a feature useful for position detection.

Problem to Solve in This Example Embodiment

In Patent Document 11, the feature value of a subject is extracted from a frequency spectrum image obtained after executing frequency transformation and polar coordinate transformation on an image of the subject. However, in Patent Document 11, image alignment is not performed at the time of feature value extraction. Therefore, at the time of collation, at the time of collation, there is a need to change the combination of a direction on an input feature information vector and a direction on a registered feature information vector and calculate the sum of the distances between the two vectors, thereby coping with misalignment caused by difference in direction of the subject at every reading of biometric information. This requires processing of a large number of combinations at the time of collation with only one registered image, and the amount of processing becomes enormous. Thus, it is conceived to apply the image alignment technique described in Patent Document 12 to the technique described in Patent Document 11.

In patent Document 12, correction information (magnification information, rotation information) of a first image with respect to a second image is generated, both the images are corrected based on the correction information, and thereafter, collation between the first image and the second image is performed. The correction information is generated from a parallel movement amount obtained by phase-only correlation between feature values that are obtained by executing Fourier-Mellin transform on both the images to obtain feature values that are invariant to position and in each of which magnification/rotation has been transformed to parallel movement. Therefore, even if the position, orientation, and magnification of an object at the time of collation are different from those at the time of registration, it is possible to collate the images by processing once. Moreover, by using the method described in Patent Document 13 assuming that the collated image is the referred image and an individual image to be collated is the fiducial image in generation of the correction information, it may be possible to generate the correction information with higher accuracy and perform highly accurate collation.

However, in the case of collating a collated image with a large number of registered images and deciding a matching registered image, that is, in the case of performing individual identification a large number of times, there is still a problem that the amount of processing becomes enormous according to the techniques described in Patent Documents 12 and 13. To be specific, because there is a need to repeatedly execute three processes, which are a process of estimating the correction information, a process of correcting misalignment of a collated image based on the correction information, and a process of correlating to a registered image, there is a problem that the amount of processing becomes enormous. In particular, the latter two processes are an image geometric transformation process and an image correlation process, which need a large amount of calculations. There has been a problem that repeatedly executing these processes on a database including a large number of registered images is not practical because the amount of processing becomes enormous.

An object of this example embodiment is to provide an individual identification device that can solve the above-mentioned problem, specifically, that can realize fast collation on a database including many registrations.

Means for Solving the Problem

Unlike the conventional techniques, this example embodiment is characterized in that individual identification for a large number of individuals is performed with a much less amount of processing, without executing either a process of generating misalignment correction information between a collated image and a registered image and correcting the images based on the correction information or a process of collating the images after the alignment correction process. To be specific, this example embodiment uses a fact that position information of a target object in the collated image is not necessary for individual identification. That is, unless the images include the same individuals, a correlation between feature values is not obtained. Thus, it is judged whether or not the images include the same individuals based on a fact that a correlation peak is obtained.

For this reason, in this example embodiment, a feature which is common to different individuals, that is, a feature which is effective for generation of alignment correction information is not used in correlation calculation. The common feature is decided based on images of different individuals registered in an individual identification database and different images of the same individual generated by geometric transformation and noise addition. To be specific, a frequency spectrum (FMFS) image obtained by executing frequency transformation on a feature value (a Fourier-Mellin feature (FM)) which does not depend on misalignment, magnification, or rotation is extracted from each registered image in the database, and only components unique to an individual are extracted from the FMFS (a feature which is common to different individuals is eliminated. At the time of collation, by calculating a correlation using only the individual unique components after eliminating the features common to different individuals, a peak cannot be detected on a correlation value map with respect to images of objects that do not include the same individual. Due to the absence of the correlation peak, it is possible to immediately judge the result of identification as different individuals without executing the alignment process. On the other hand, in collation with the image including the same individual, it is possible to detect a correlation peak, and it becomes possible to immediately judge the result of identification as the same individual and specify the individual.

The individual identification device according to this example embodiment includes a transformation part, a feature correlation part, and a collation part. The transformation part executes Fourier-Mellin transform (frequency transformation and log-polar coordinate transformation) on an image obtained by capturing an object to obtain a Fourier-Mellin feature (FM feature) image, and further executes frequency transformation on the FM feature image to extract a FM feature frequency spectrum (FMFS) image. The feature correlation part obtains a normalized cross power spectrum between the abovementioned FMFS images after frequency transformation, based on partial areas in the FMFS images of images of multiple individuals to be registered, fills zero into a cross power spectrum other than the abovementioned partial areas, and detects a peak on a correlation map obtained by inverse Fourier transform. The collation part performs individual identification based on the presence/absence of the peak and the value of the peak.

Unlike the conventional techniques, this example embodiment is characterized in that either an image alignment part or a part for collating an image with position correction executed are not included. Moreover, this example embodiment is characterized in that partial area feature extraction is performed, not on a Fourier-Mellin feature image in which there is misalignment due to change of magnification and rotation of a collated image, but on a frequency spectrum image after Fourier transform in which misalignment does not occur. Besides, this example embodiment is characterized by including a decision part that decides the partial areas from the images of an individual registered on the database as a collation target The deciding part is configured to decide a FMFS image partial area having small contribution to the peak on the correlation map between FMFS images obtained from images of different individuals.

Furthermore, this example embodiment is characterized by including a deciding part that decides an evaluation value threshold value or the like for detecting the peak on the correlation map based on images of an individual registered in a database as a collation target.

Effect of This Example Embodiment

Because this example embodiment has the abovementioned configuration, it is possible to perform identification at high speeds which individual a collated image shows among a large number of registered individuals, without performing alignment of an image obtained by capturing an object.

Below, this example embodiment will be described for each article. This example embodiment utilizes a fact that on the surface of each of multiple products produced through the same production process, there is a minute pattern unique to the product and a minute pattern common to the multiple products. Moreover, this example embodiment utilizes a fact that a minute pattern unique to each product and a minute pattern common to multiple products are different in spatial frequency of Fourier-Mellin feature image.

Configuration of This Example Embodiment

Figure 12:
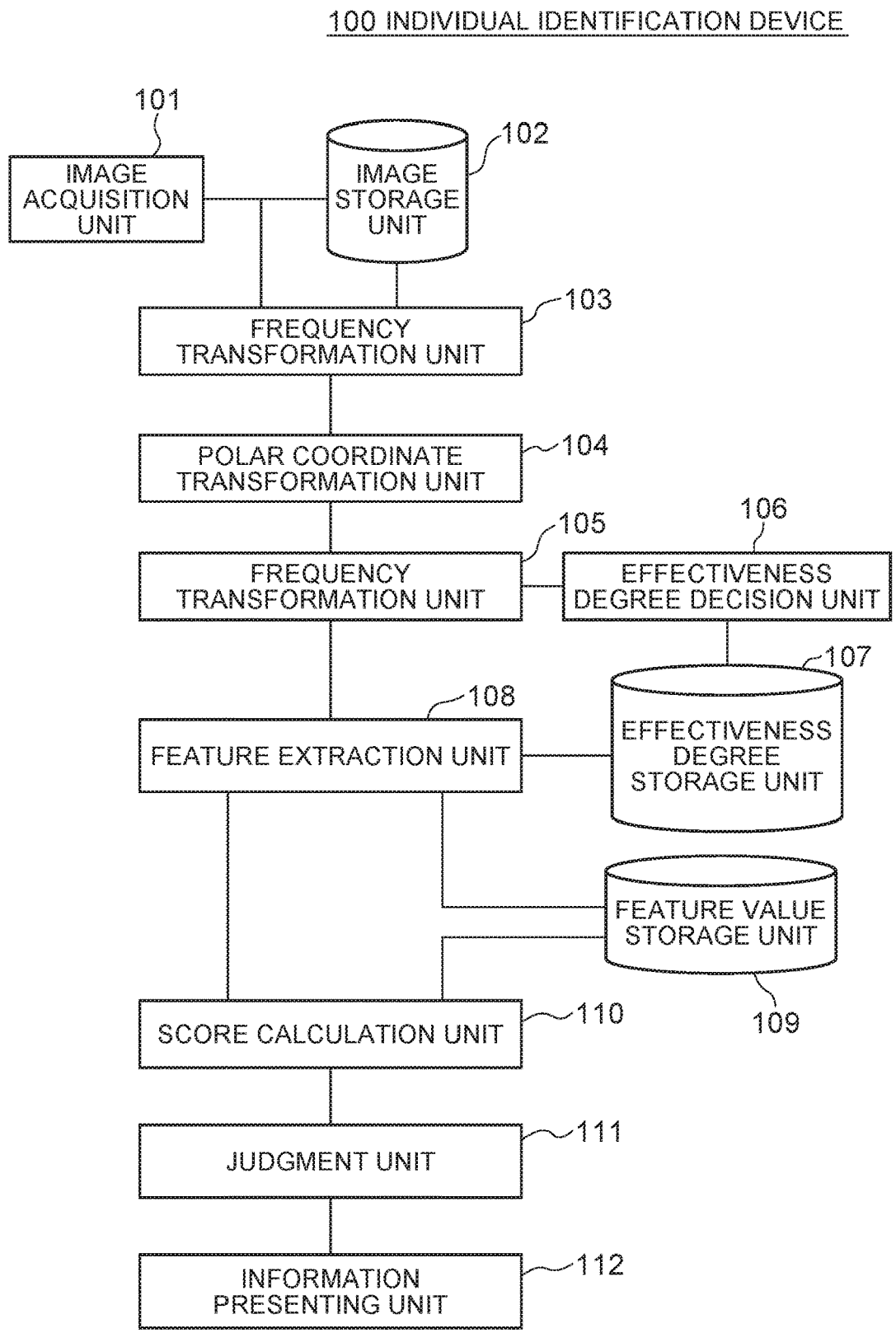
FIG. 12 is a block diagram of an individual identification device according to a second example embodiment of the present invention.

FIG. 12 is a block diagram of an individual identification device 100 according to this example embodiment. The individual identification device 100 according to this example embodiment includes an image acquisition unit 101, an image storage unit 102, a frequency transformation unit 103, a polar coordinate transformation unit 104, a frequency transformation unit 105, an effectiveness degree decision unit 106, an effectiveness degree storage unit 107, a feature extraction unit 108, a feature value storage unit 109, a score calculation unit 110, a judgment unit 111, and an information presenting unit 112.

The image acquisition unit 101 has a function to acquire an image of the surface of a product to be managed. The image storage unit 102 has a function to store the image acquired by the image acquisition unit 101. The frequency transformation unit 103 has a function to execute frequency transformation on an image to transform the image into a frequency spectrum image. Although two-dimensional discrete Fourier transform is used as the frequency transformation, the frequency transformation may be another type of frequency transformation, such as two-dimensional discrete wavelet transform. The polar coordinate transformation unit 104 has a function to generate a Fourier-Mellin feature (FM) image by transforming the frequency spectrum image into polar coordinates. The frequency transformation unit 105 has a function to generate a Fourier-Mellin feature frequency spectrum (FMFS) image by further executing frequency transformation on the Fourier-Mellin feature (FM) image. The effectiveness degree decision unit 106 has a function to determine the degree of effectiveness for each partial area of the FMFS image. The effectiveness degree decision unit 106 sets the degree of effectiveness of a partial area lower as the partial area includes more frequency features (common features) appearing in common to images of the surfaces of multiple products. The effectiveness degree storage unit 107 has a function to store the degree of effectiveness for each partial area output from the effectiveness degree decision unit106, The feature extraction unit 108 has a function to calculate a feature value unique to an individual from one or more partial areas whose degrees of effectiveness stored in the effectiveness degree storage unit 107 are equal to or more than a reference value, among partial areas configuring a Fourier-Mellin feature frequency spectrum (FMFS) image obtained by executing polar coordinate transformation on a frequency spectrum image of a captured image of the surface of a product to be managed. The feature value storage unit 109 has a function to store the feature value unique to the individual obtained by the feature extraction unit 108 from the captured image. The score calculation unit 110 has a function to calculate a correlation between FMFS of the feature value unique to the individual obtained by the feature extraction unit 108 from the Fourier-Mellin feature frequency spectrum (FMFS) image obtained by executing polar coordinate transformation on a frequency spectrum image of the captured image serving as a query image and the feature value stored in the feature value storage unit 109, and calculate a score (a numerical value) based on the presence/absence of a peak on a correlation map obtained by executing inverse Fourier transform and a value indicating the sharpness of the peak. The judgment unit 111 has a function to output the result of judgment of identification and collation, based on the score obtained by the score calculation unit 110. The information presenting unit 112 has a function to present individual management information based on the result of judgment.

Figure 13:
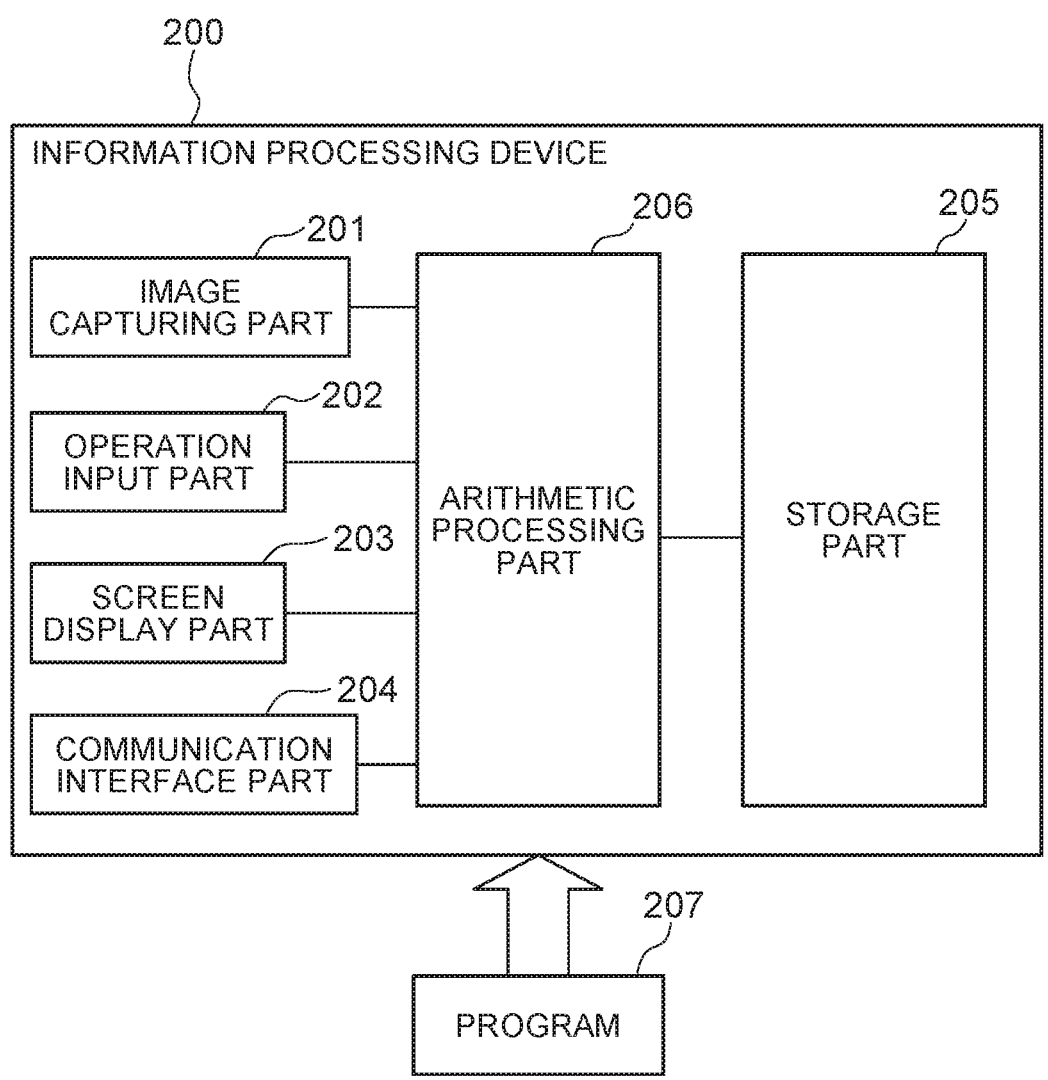
FIG. 13 is a block diagram showing an example of a hardware configuration of the individual identification device according to the second example embodiment of the present invention.

The individual identification device 100 can be realized by an information processing device 200 such as a personal computer or a smartphone and a program 207, for example, as shown in FIG. 13. The information processing device 200 includes an image capturing part 201 such as a camera, an operation input part 202 such as a keyboard or a mouse, a screen display part 203 such as a liquid display, a communication interface part 204, a storage part 205 such as a memory or a hard disk, and an arithmetic processing part 206 such as one or more microprocessors.

The program 207 is loaded from an external computer-readable storage medium into a memory when the information processing device 200 is started, and controls the operation of the arithmetic processing part 206 and thereby realizes, on the arithmetic processing part 206, functional units such as the image acquisition unit 101, the image storage unit 102, the frequency transformation unit 103, the polar coordinate transformation unit 104, the frequency transformation unit 105, the effectiveness degree decision unit 106, the effectiveness degree storage unit 107, the feature extraction unit 108, the feature value storage unit 109, the score calculation unit 110, the judgment unit 111, and the information presenting unit 112.

Next, the operation of the individual identification device 100 according to this example embodiment will be described. The operation of the individual identification device 100 is largely divided into the following three operations:

(a) preprocessing operation of deciding the degree of effectiveness relating to score calculation;
(b) operation of individual registration; and
(c) operation of individual identification and individual collation

[Preprocessing: Effectiveness Degree Decision Process]

First, as a preliminary process, a process of deciding the degree of effectiveness relating to score calculation will be described.

Figure 14:
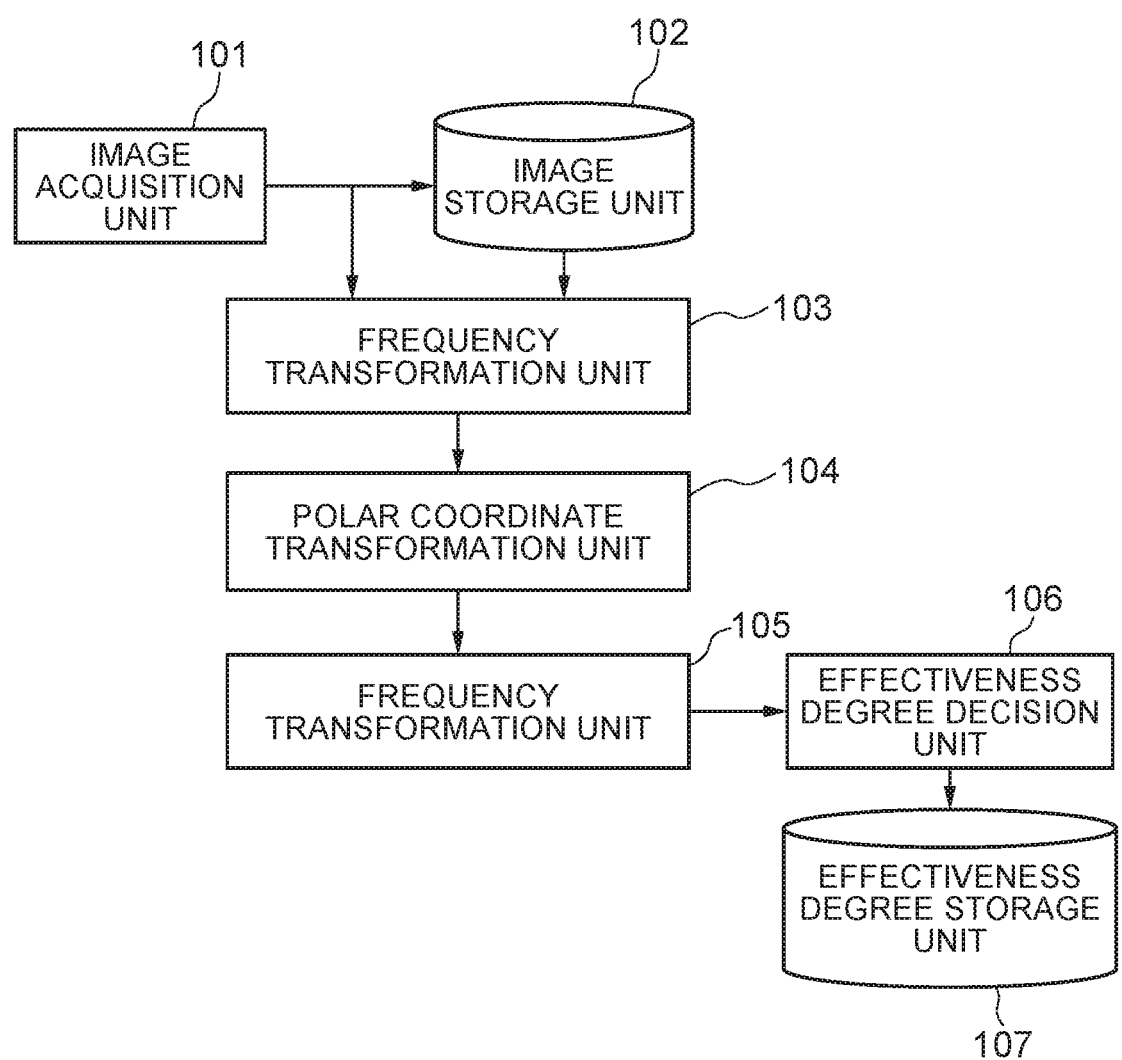
FIG. 14 is an operation flow diagram for deciding the degree of effectiveness relating to score calculation in the individual identification device according to the second example embodiment of the present invention.
Figure 15:
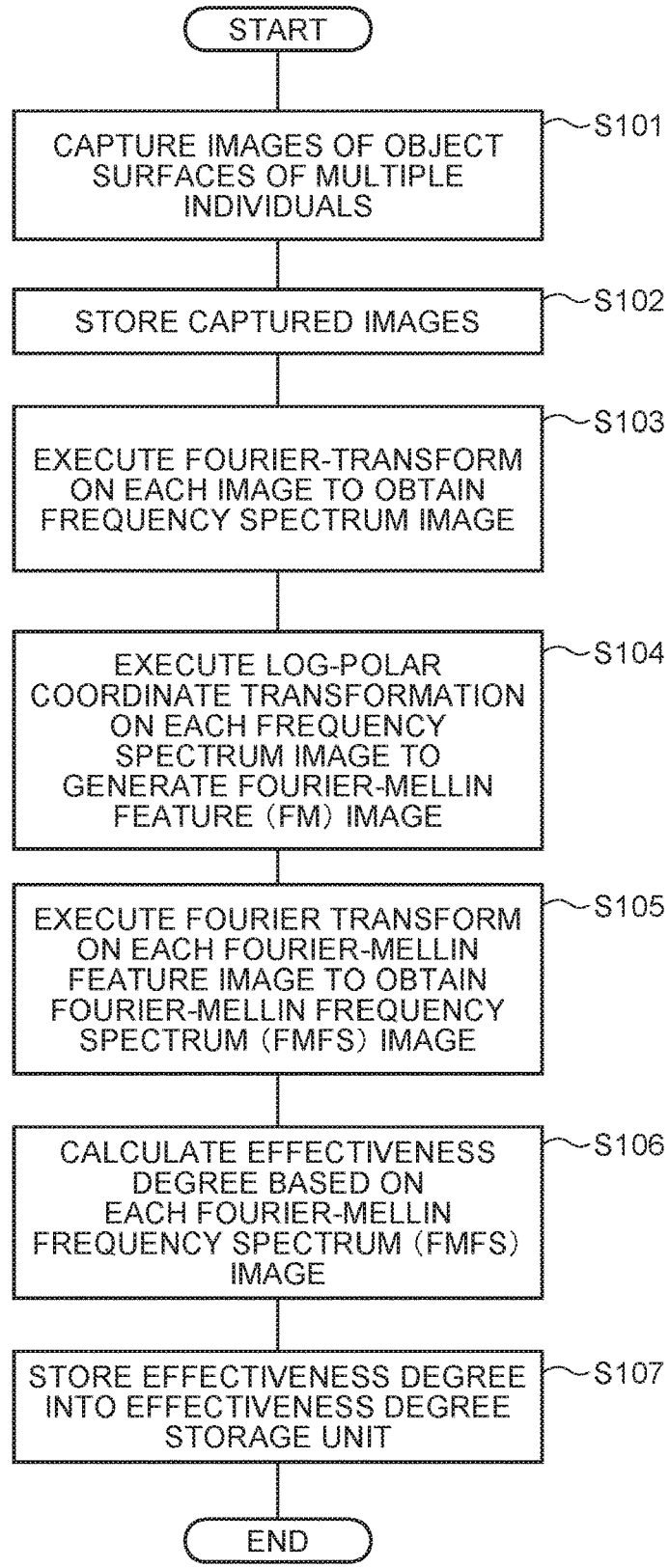
FIG. 15 is a flowchart showing an example of a process of deciding the degree of effectiveness relating to score calculation in the individual identification device according to the second example embodiment of the present invention.

FIGS. 14 and 15 are an operation flow and a flowchart of the effectiveness degree decision process.

<Acquisition and Storage of Image>

First, the image acquisition unit 101 acquires an image of a surface pattern of each of multiple products to be managed, and stores the image into the image storage unit 102 (step S101). The image acquisition unit 101 acquires at least one image for each individual, and stores the image into the image storage unit 102. Alternatively, in order to increase the accuracy of the degree of effectiveness, the image acquisition unit 101 may acquire multiple images for each individual and store the images into the image storage unit 102. The image acquisition unit 101 may be an image capturing device such as a camera or a scanner, a device for image data acquisition via a network, or a device for image data acquisition via a storage medium such as a CD-ROM.

Further, in a case where there are multiple production lines for producing products to be managed, the image acquisition unit 101 stores the acquired product surface pattern images into the image storage unit 102 separately for each of the production lines. Herein, the production line includes a process of assembly on an assembly line or a single assembly process by a single processing machine, which is made for mass-production of the same products or the same kind of products.

For example, it is assumed that products are mass-produced by casting or forging with a mode A1 on a first production line and products are mass-produced by casting or forging with a mode A2 that is the same as the mode A1 on a second production line. In this case, the image acquisition unit 101 separately stores the surface pattern image of the product produced on the first production line and the surface pattern image of the product produced on the second production line, into the image storage unit 102. At this time, a pattern unique to the mode A1 has been transferred onto the entire surface of the product produced on the first production line. Likewise, a pattern unique to the mold A2 has been transferred onto the entire surface of the product produced on the second production line.

Alternatively, for example, it is assumed that products are mass-produced by cutting a material with a cutting device B1 on the first production line and products are mass-produced by cutting a material with a cutting device B2 that is the same as the cutting device B1 on the second production line. In this case, the image acquisition unit 101 separately stores the surface pattern image of the product produced on the first production line and the surface pattern image of the product produced on the second production line, into the image storage unit 102. At this time, fine irregularities of surface roughness unique to the cross section of a blade used for cutting of the cutting device B1 appear on the cut surface of the product produced on the first production line. Likewise, fine irregularities of surface roughness unique to the cross section of a blade used for cutting of the cutting device B2 appear on the cut surface of the product produced on the second production line. The method using the same processes and the method using the same devices described herein are merely examples, and method using other same production processes and processing devices can also be employed.

Figure 16A:
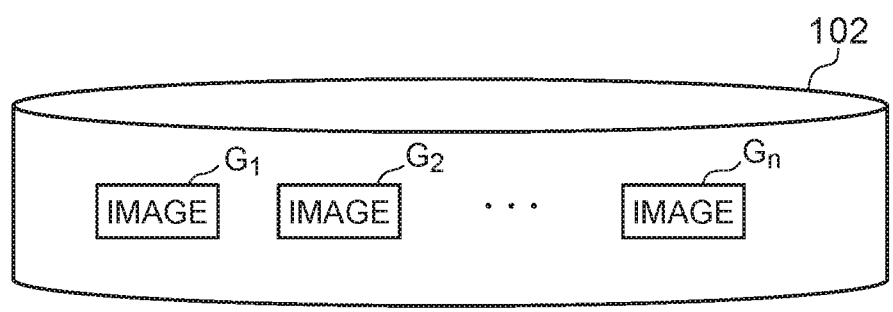
FIG. 16A is a view showing an example of the content of an image storage unit in the individual identification device according to the second example embodiment of the present invention.
Figure 16B:
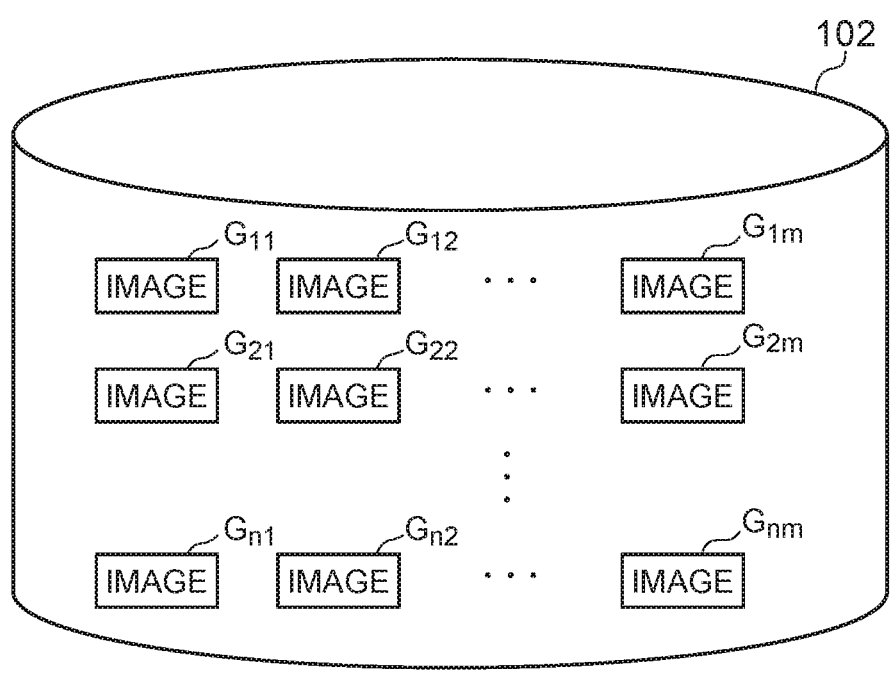
FIG. 16B is a view showing an example of the content of the image storage unit in the individual identification device according to the second example embodiment of the present invention.
Figure 16C:
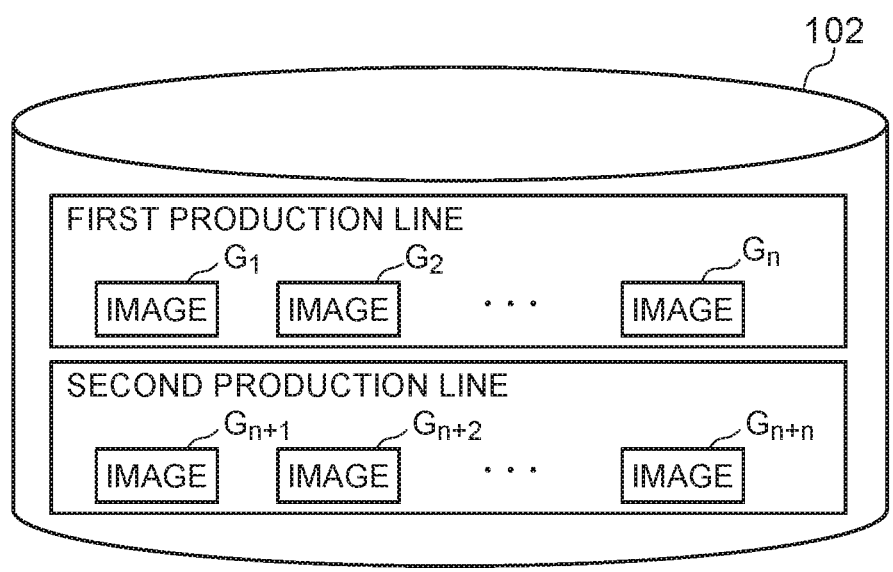
FIG. 16C is a view showing an example of the content of the image storage unit in the individual identification device according to the second example embodiment of the present invention.

FIGS. 16A to 16C show examples of the content of the image storage unit 102. FIG. 16A shows an example in which the image acquisition unit 101 acquires one image for each individual and stores the image into the image storage unit 102. Images $G_1, \ldots, G_n$ are n images corresponding to n products on one-to-one basis. FIG. 16B shows an example in which the image acquisition unit 101 acquires m (m≥2) images for each individual and stores the images into the image storage unit 102. Images $G_{11}, \ldots, G_{1m}$, images $G_{21}, \ldots, G_{2m}$, images $G_{n1}, \ldots, G_{nm}$ are n×m images corresponding to n products on one-to-one basis. In a case where only a single image can be captured for each individual, multiple images are generated by adding noise or geometric transformation based on the captured single image. FIG. 16C shows an example in which the image acquisition unit 101 stores product images into the image storage unit 102 separately for each production line. Images $G_1, \ldots, G_n$ are n images corresponding one-to-one to n products produced on the first production line. Images $G_{n+1}, \ldots, G_{n+n}$ are n images corresponding one-to-one to n products produced on the second production line. In the example of FIG. 16C, one image is stored for each individual, but multiple images may be stored for each individual.

<Effectiveness Degree Decision Process>

Next, the frequency transformation unit 103 retrieves surface pattern images of multiple products to be managed from the image storage unit 102, and transforms the images into two-dimensional spectrum frequency spectrum data (step S103). At step S103, the frequency transformation unit 103 may further transform the acquired two-dimensional frequency spectrum data to logarithmic amplitude spectrum data by taking the logarithm of the data. Hereinafter, the two-dimensional frequency spectrum data obtained in this process will be referred to as a frequency spectrum image.

Next, the polar coordinate transformation unit 104 transforms the frequency spectrum image obtained by the frequency transformation unit 103 into log-polar coordinates and generates a FM image (step S104). In general, movement in the rotation direction on the actual coordinates is movement in the lateral direction along the θ axis on the polar coordinates. Therefore, the amount of rotation fluctuation between the two frequency spectrum images is expressed by the amount of parallel movement along the θ axis between the two frequency spectrum images after the polar coordinate transformation. Moreover, in general, scale variation on the actual coordinates is movement in the lateral direction along the log-r axis on the log-polar coordinates. Therefore, the amount of rotation fluctuation and the scale variation between the two frequency spectrum images are expressed by the amount of parallel movement along the θ axis and the amount of parallel movement along the log-r axis between the two frequency spectrum images after the log-polar coordinate transformation. Accordingly, transformation to a FM image is effective in a case where there is scale variation in addition to rotation fluctuation between captured images at the time of image acquisition.

Figure 17A:
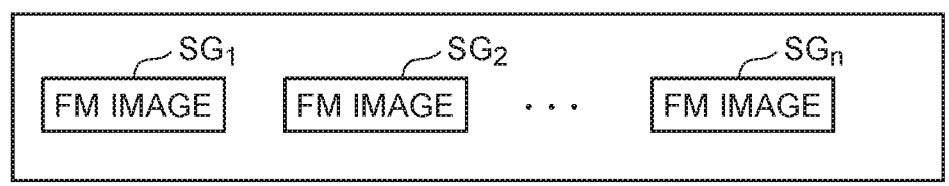
FIG. 17A is a view showing an example of a Fourier-Mellin feature (FM) image generated in the course of processing in the individual identification device according to the second example embodiment of the present invention.
Figure 17B:
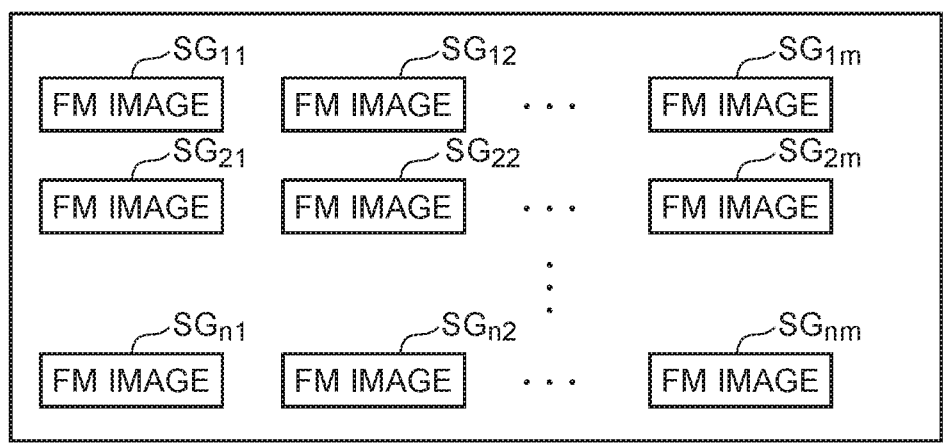
FIG. 17B is a view showing an example of a Fourier-Mellin feature (FM) image generated in the course of processing in the individual identification device according to the second example embodiment of the present invention.
Figure 17C:
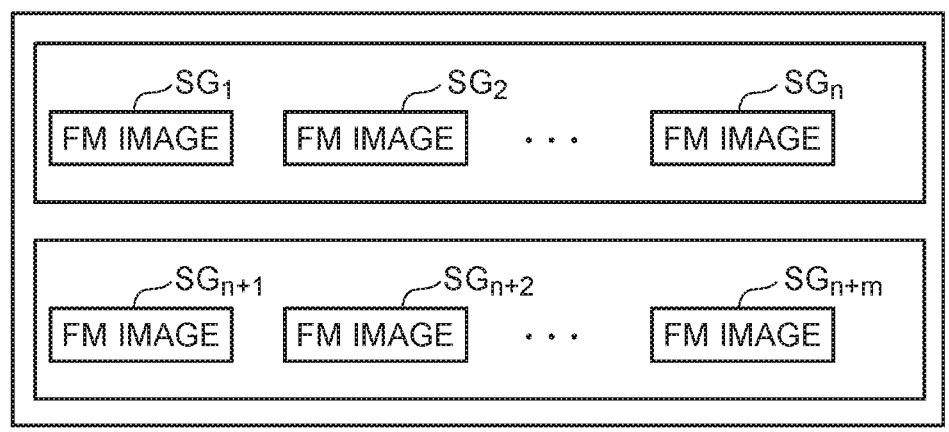
FIG. 17C is a view showing an example of a Fourier-Mellin feature (FM) image generated in the course of processing in the individual identification device according to the second example embodiment of the present invention.

FIGS. 17A to 17C show examples of the result of processing by the frequency transformation unit 103 and the polar coordinate transformation unit 104. FIG. 17A shows the result of processing one image for each individual shown in FIG. 16A. Images $SG_1, \ldots, SG_n$ are n Fourier-Mellin feature images (FM images) corresponding to n products on one-to-one basis. FIG. 17B shows the result of processing m (m≥2) images for each individual shown in FIG. 16B. Images $SG_{11}, \ldots, SG_{1m}$, images $SG_{21}, \ldots, SG_{2m}$, images $SG_{n1}, \ldots, SG_{nm}$ are n×m Fourier-Mellin feature images (FM images) corresponding to n products on one-to-one basis. FIG. 17C shows the result of processing images for each production line shown in FIG. 16C. Images $SG_1, \ldots, SG_n$ are n Fourier-Mellin feature images (FM images) corresponding one-to-one to n products produced on the first production line. Images $SG_{n+1}, \ldots, SG_{n+n}$ are n Fourier-Mellin feature images corresponding one-to-one to n products produced on the second production line.

Next, the frequency transformation unit 105 generates an image (a FMFS image) obtained by executing frequency transformation on the FM image output from the polar coordinate transformation unit 104 (step S105).

Figure 18A:
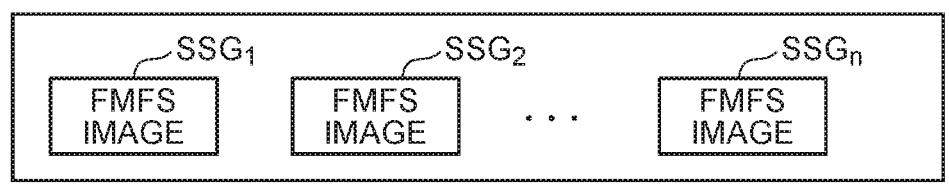
FIG. 18A is a view showing an example of a Fourier-Mellin feature frequency spectrum (FMFS) image generated in the course of processing in the individual identification device according to the second example embodiment of the present invention.
Figure 18B:
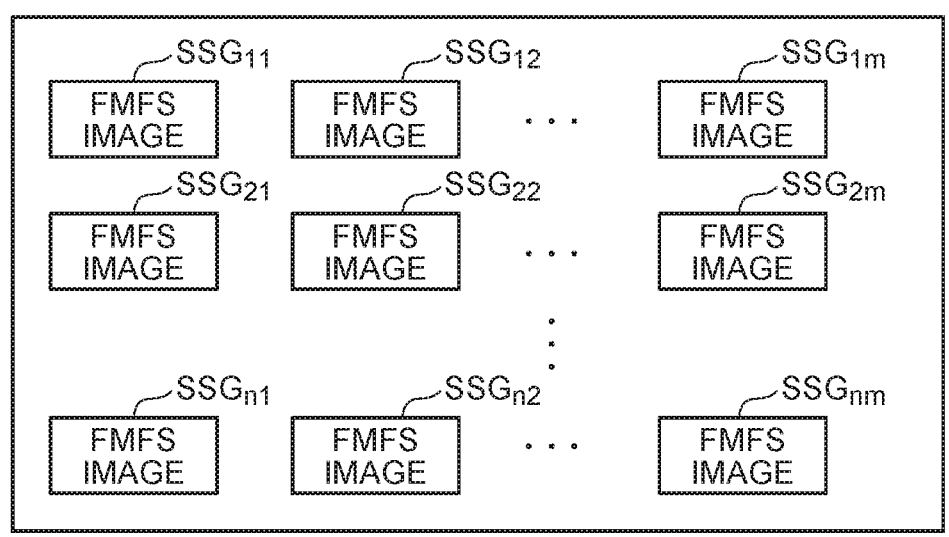
FIG. 18B is a view showing an example of a Fourier-Mellin feature frequency spectrum (FMFS) image generated in the course of processing in the individual identification device according to the second example embodiment of the present invention.
Figure 18C:
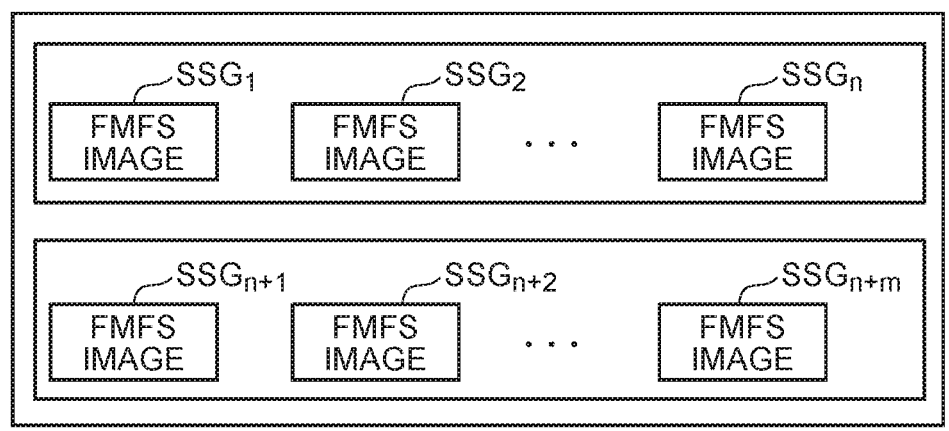
FIG. 18C is a view showing an example of a Fourier-Mellin feature frequency spectrum (FMFS) image generated in the course of processing in the individual identification device according to the second example embodiment of the present invention.

FIGS. 18A to 18C show examples of the result of processing by the frequency transformation unit 105. FIG. 18A shows the result of processing one FM image for each individual shown in FIG. 17A. Images $SSG_1, \ldots, SSG_n$ are FMFS images obtained by executing frequency transformation on n FM images corresponding one-to-one to n products. FIG. 18B shows the result of processing m (m≥2) FM images for each individual shown in FIG. 17B. Images $SSG_{11}, \ldots, SSG_{1m}$, images $SSG_{21}, \ldots, SSG_{2m}$, images $SSG_{n1}, \ldots, SSG_{nm}$ are FMFS images obtained by executing frequency transformation on n×m FM images corresponding one-to-one to n products. FIG. 18C shows the result of processing images for each production line shown in FIG. 17C. Images $SSG_1, \ldots, SSG_n$ are FMFS images obtained by executing frequency transformation on n FM images corresponding one-to-one to n products produced on the first production line. Images $SSG_{n+1}, \ldots, SSG_{n+n}$ are FMFS images obtained by executing frequency transformation on n FM images corresponding one-to-one to n products produced on the second production line.

Next, the effectiveness degree decision unit 106 calculates the degree of effectiveness for each partial area by using the FMFS images obtained by the frequency transformation unit 105 (step S106). Below, a method for calculating the degree of effectiveness for each partial area will be described in detail.

<Calculation of Effectiveness Degree>

The effectiveness degree decision unit 106 extracts specific portions as images of a partial area from FMFS images obtained from multiple pairs of images of different products, and executes a score calculation process (synthesis of cross power spectrums (product for each element), zero-padding of the other partial areas, calculation of a correlation value map by inverse Fourier transform, and calculation of the evaluation value of presence/absence (sharpness) of maximum value peak on the correlation value map) on all the partial area images, thereby calculating a degree that the partial area contributes to the presence/absence of a correlation value peak between different individuals. At this time, the effectiveness degree decision unit 106, while changing partial areas one after the other, obtains correlation value maps with respect to all pairs of images of different individuals, and obtains the S/N ratios of the peaks on the respective maps and the surrounding areas of the peaks, thereby obtaining the level of the S/N ratios between different individuals (specifically, the average value, or the like).

Further, the effectiveness degree decision unit 106 executes the same process as described above on pairs of images of the same individual products, and calculates a degree that the partial area contributes to the presence/absence of a correlation value peak between the same individuals (specifically, the average value of the S/N ratios).

Then, the effectiveness degree decision unit 106 determines the ratio of the contribution to the peak between the same individuals and the contribution to the peak between different individuals, to be a contribute as an individual unique feature of the partial area. As the contribution, other than the average value, various statistical values such as the degree of separation between a set of values between different individuals and a set of values between the same individuals can be used.

The effectiveness degree decision unit 106 executes the abovementioned process on various partial areas, selects only one partial area (or multiple partial areas) whose contribution as the individual unique feature is high, and sets the degree of effectiveness of the selected partial area to 1. As one example, the effectiveness degree decision unit 106 can divide an FMFS image into certain sizes, executes the abovementioned process on each area, and decides a certain number of partial areas as partial areas whose degrees of effectiveness are 1 in order of the contributions as the individual unique features.

Figure 25A:
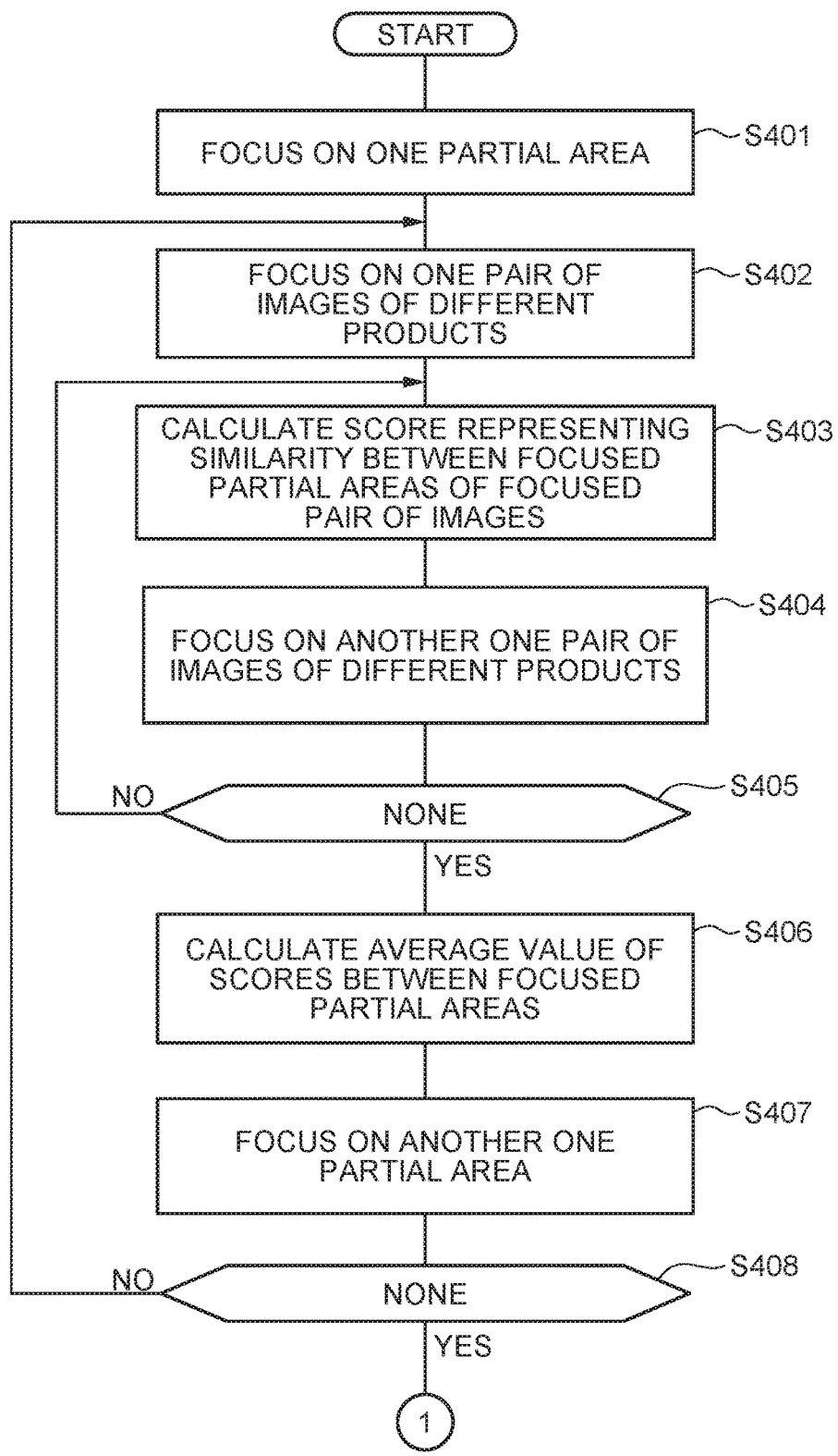
FIG. 25A is a flowchart showing the details of step S106 of FIG. 15.
Figure 25B:
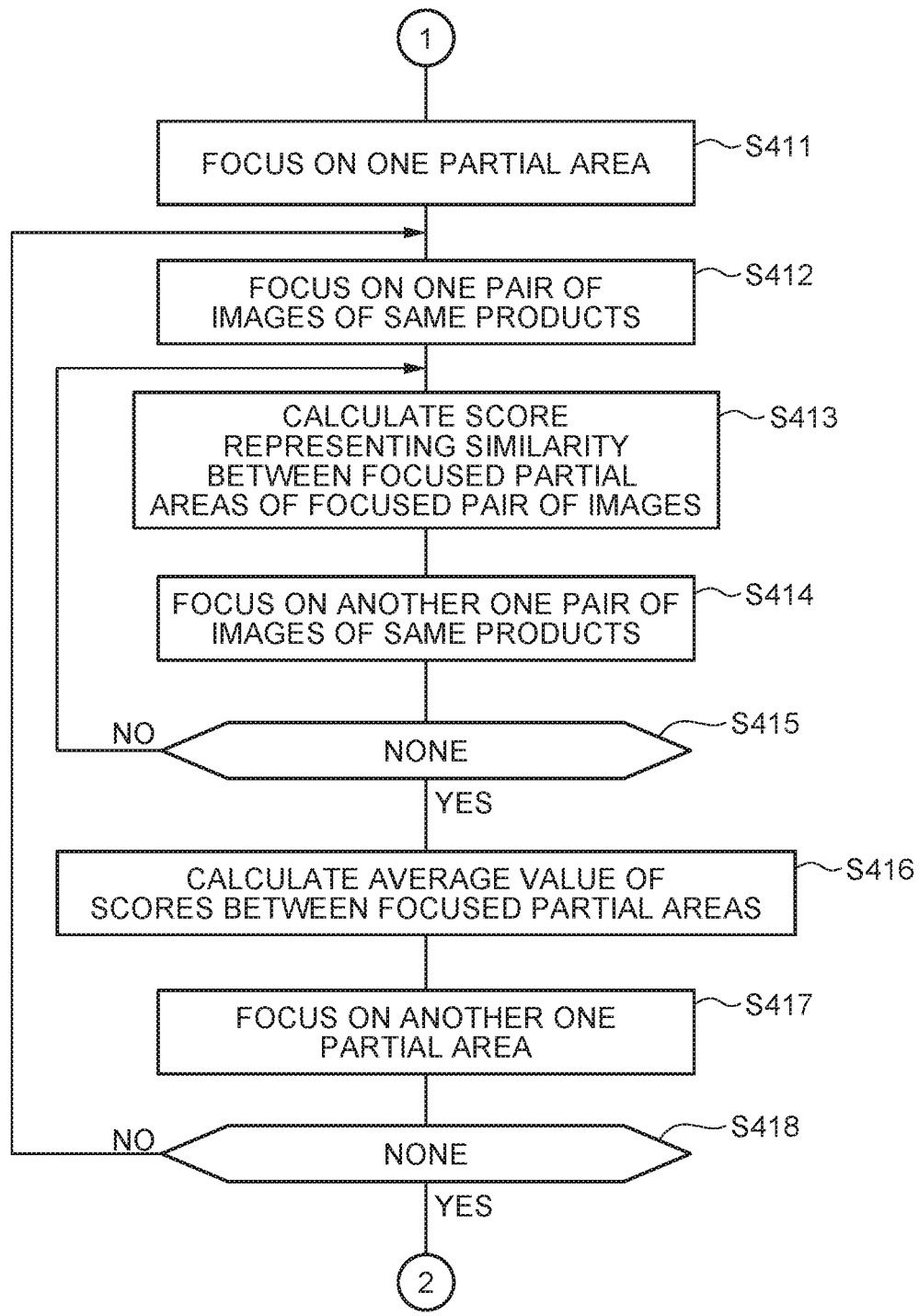
FIG. 25B is a flowchart showing the details of step S106 of FIG. 15.
Figure 25C:
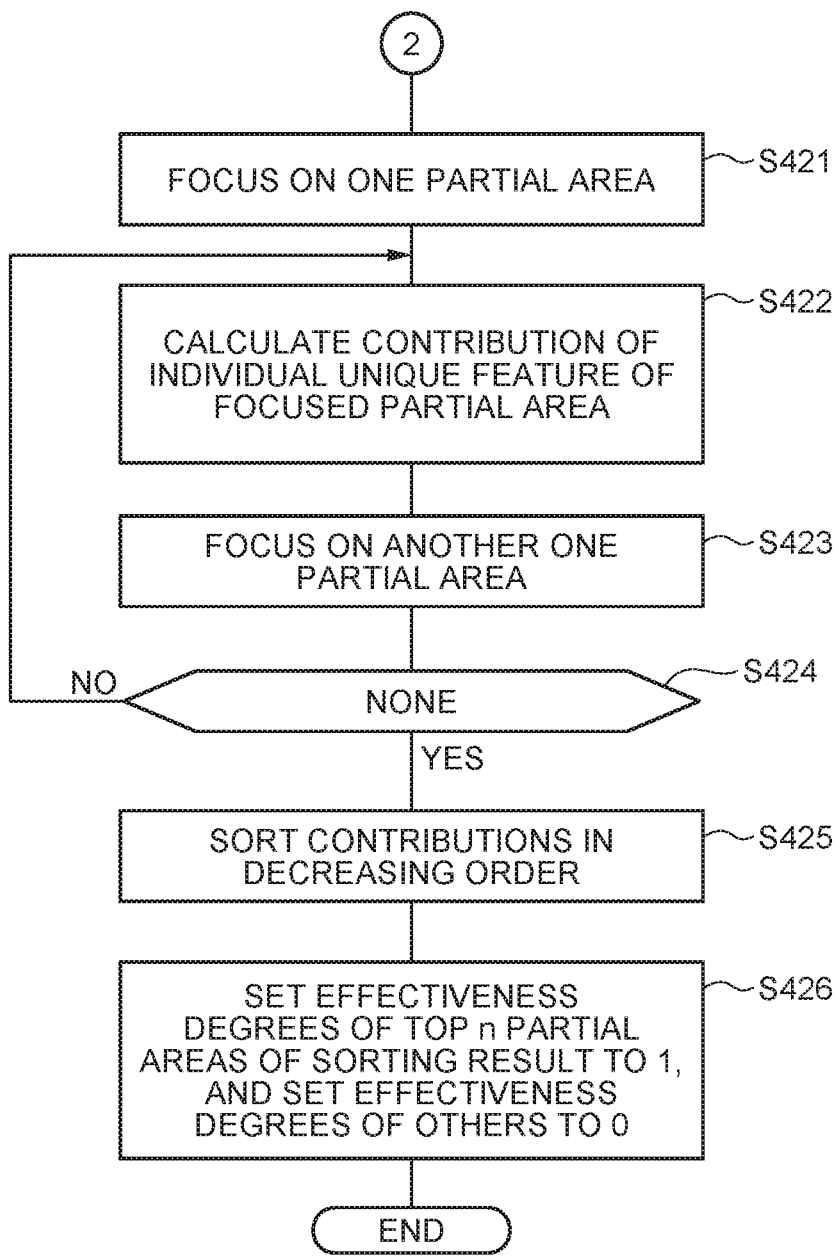
FIG. 25C is a flowchart showing the details of step S106 of FIG. 15.

FIGS. 25A to 25C are flowcharts showing the details of step S106 of FIG. 15. The effectiveness degree decision unit 106 first focuses on one of multiple partial areas obtained by dividing an FMFS image into certain sizes (step S401). Next, the effectiveness degree decision unit 106 focuses on one pair of images from among multiple pairs of images of different products (step S402). That is, the effectiveness degree decision unit 106 focuses on the pair of an image of one product and an image of another product different from the one product. Next, the effectiveness degree decision unit 106 calculates a score indicating the similarity between the focused partial areas of the focused pair of images (step S403). The score may be, for example, the peak value on a correlation value map between the focused partial areas of the focused pair of images. Otherwise, the score may be a S/N ratio assuming that the peak value is a signal (S) and, for example, a second-highest peak value is noise (N). Next, the effectiveness degree decision unit 106 focuses on another one pair of images of different products (step S404), and returns to step S403 to execute the same process as the abovementioned process. When the effectiveness degree decision unit 106 has focused on all the pairs of images of different products (YES at step S405), the effectiveness degree decision unit 106 calculates the average value of the scores calculated for the respective pairs of images of different products with respect to the focused partial area, and determines the calculated average value of the scores as a score indicating the contribution to a peak between different products of the focused partial area (step S406). Next, the effectiveness degree decision unit 106 focuses on another one of the partial areas (step S407), and returns to step S402 to execute the same process as the abovementioned process. Moreover, when the effectiveness degree decision unit 106 has focused on all the partial areas (YES at step S408), the effectiveness degree decision unit 106 proceeds to step S411 of FIG. 25B.

At step S411, the effectiveness degree decision unit 106 focuses on one of the multiple partial areas again. Next, the effectiveness degree decision unit 106 focuses on one pair of images from among multiple pairs of images of the same products (step S412). That is, the effectiveness degree decision unit 106 focuses on the pair of images of the same products. Next, the effectiveness degree decision unit 106 calculates a score indicating the similarity between the focused partial areas of the focused pair of images in the same manner as at step S403 (step S413). Next, the effectiveness degree decision unit 106 focuses on another one pair of images of the same products (step S414), and returns to step S413 to execute the same process as the abovementioned process. When the effectiveness degree decision unit 106 has focused on all the pairs of images of the same products (YES at step S415), the effectiveness degree decision unit 106 calculates the average value of the scores calculated for the respective pairs of images of the same products with respect to the focused partial area, and sets the calculated average value of the scores as a score indicating the contribution to a peak between the same products of the focused partial area (step S416). Next, the effectiveness degree decision unit 106 focuses on another one of the partial areas (step S417), and returns to step S412 to execute the same process as the abovementioned process. Moreover, when the effectiveness degree decision unit 106 has focused on all the partial areas (YES at step S418), the effectiveness degree decision unit 106 proceeds to step S421 of FIG. 25C.

At step S421, the effectiveness degree decision unit 106 focuses on one of the multiple partial areas again. Next, the effectiveness degree decision unit 106 calculates the ratio of the score indicating the contribution to the peak between the same products of the focused partial area to the score indicating the contribution to the peak between different products of the focused partial area, as the contribution that is the individual unique feature of the focused partial area (step S422). Next, the effectiveness degree decision unit 106 focuses on another one of the partial areas (step S423), and returns to step S422 to execute the same process as the abovementioned process. When the effectiveness degree decision unit 106 has focused on all the partial areas (YES at step S424), the effectiveness degree decision unit 106 sorts the contributions that are the individual unique features of the respective partial areas in decreasing order so that larger ones are arranged in higher places (step S425). Next, the effectiveness degree decision unit 106 sets the degrees of effectiveness of n partial areas (n is a predetermined positive integer) corresponding to the top n contributions that are the individual unique features of the sorting result to 1, and sets the degrees of effectiveness of the other partial areas to 0 (step S426).

Further, in a case where images of surface patterns of products are stored in the image storage unit 102 for each of production lines, at step S106, the effectiveness degree decision unit 106 calculates, for each of the production lines, the degree of effectiveness for each of partial areas corresponding one-to-one to the production lines, from FMFS images of multiple products produced on the production line. Consequently, for example, from FMFS images of multiple products produced by using the mold A1, the degree of effectiveness of a partial area containing a pattern transferred in common to the respective individuals by the mode A1 at the time of production is set to 0 and, from FMFS images of multiple products produced by using the mold A2, the degree of effectiveness of a partial area containing a pattern transferred in common to the respective individuals by the mold A2 at the time of casting or forging is set to 0. Moreover, for example, from FMFS images of multiple products produced by using the cutting device B1, the degree of effectiveness of a partial area containing a common FMFS component (a common feature) deriving from fine irregularities corresponding to the cross section of the cutting blade made at the time of cutting by the cutting device B1 is set to 0 and, from FMFS images of multiple products produced by using the cutting device B2, the degree of effectiveness of a partial area containing a common component (a common feature) deriving from fine irregularities corresponding to the cross section of the cutting blade made at the time of cutting by the cutting device B2 is set to 0.

Further, in decision of the degree of effectiveness for each partial area, the effectiveness degree decision unit 106 uses multiple FMFS images of the same individuals or different individuals, and applies a statistical method such as principal component analysis or linear discriminant analysis or machine learning, thereby being able to determine a partial area that is likely to contain much noise at the time of image capturing and that has a low S/N ratio. Then, the effectiveness degree decision unit 106 sets the degree of effectiveness of the partial area having a low S/N ratio to 0, thereby setting the degree of effectiveness of only a partial area from which a feature value useful for identification of each individual with a high S/N ratio to 1. Alternatively, the effectiveness degree decision unit 106 may generate a weight coefficient corresponding to the determined S/N ratio. This weight coefficient can be used to increase the performance of individual identification and individual collation to be described below.

Figure 19A:
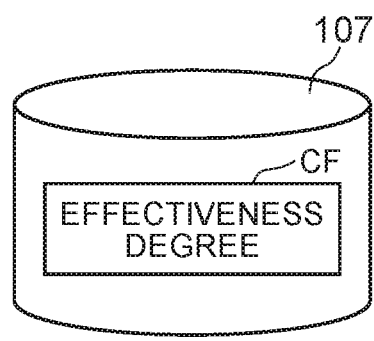
FIG. 19A is a view showing an example of the content of an effectiveness degree storage unit in the individual identification device according to the second example embodiment of the present invention.
Figure 19B:
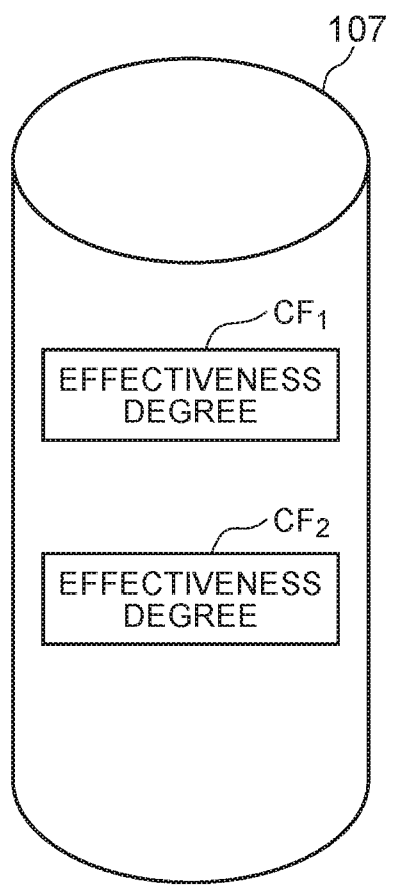
FIG. 19B is a view showing an example of the content of the effectiveness degree storage unit in the individual identification device according to the second example embodiment of the present invention.

The effectiveness degree decision unit 106 stores the calculated degree of effectiveness for each partial area into the effectiveness degree storage unit 107. FIGS. 19A and 19B show examples of the content of the effectiveness degree storage unit 107. FIG. 19A shows an example in which one effectiveness degree CF is stored in the effectiveness degree storage unit 107. FIG. 19B shows an example in which one effectiveness degree is stored for each production line. That is, an effectiveness degree $CF_1$ corresponds to a first production line, and an effectiveness degree $CF_2$ corresponds to a second production line.

[Individual Registration Operation]

Next, an individual registration operation to register each object to be managed will be described.

Figure 20:
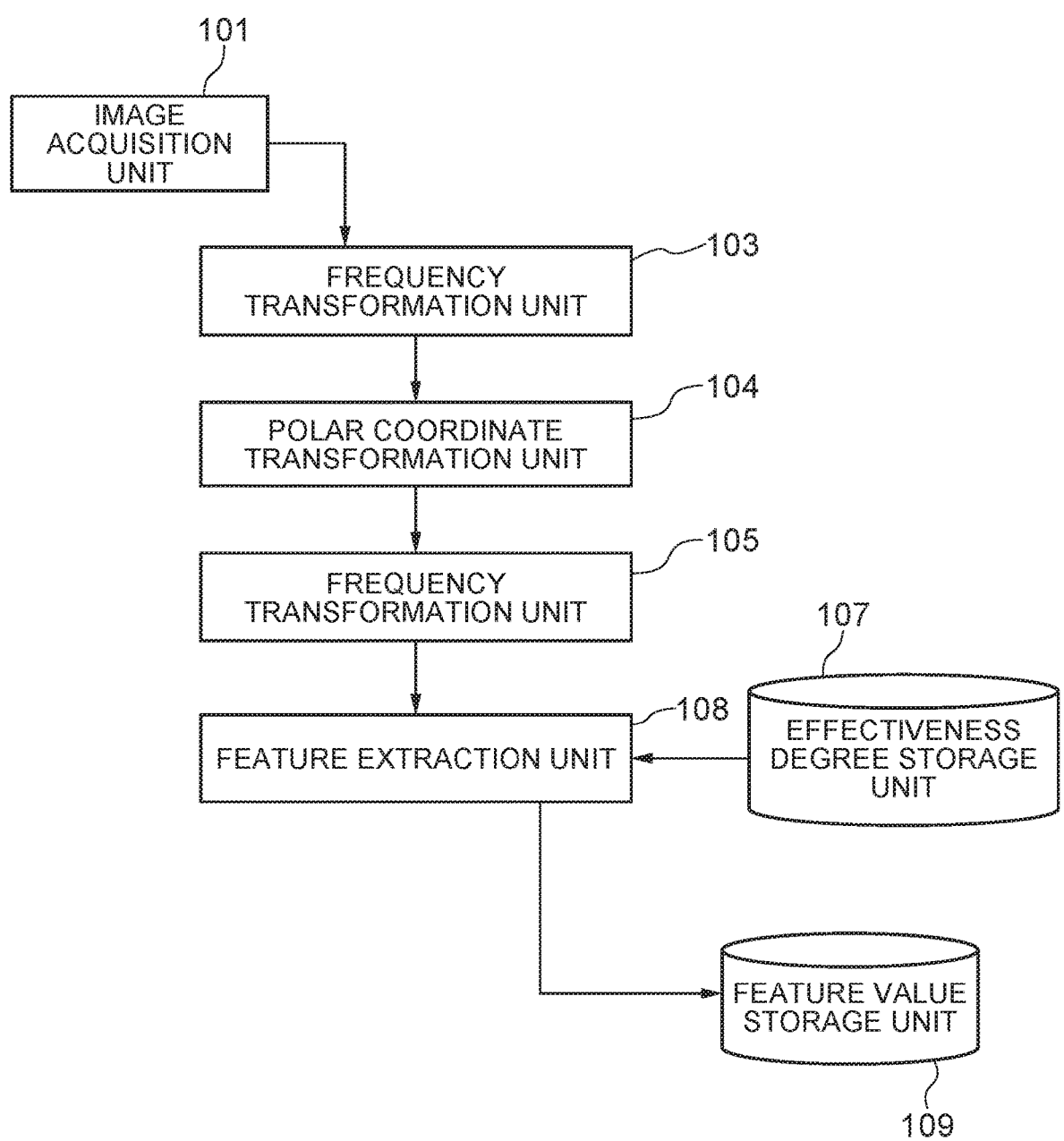
FIG. 20 is an operation flow diagram of individual registration in the individual identification device according to the second example embodiment of the present invention.
Figure 21:
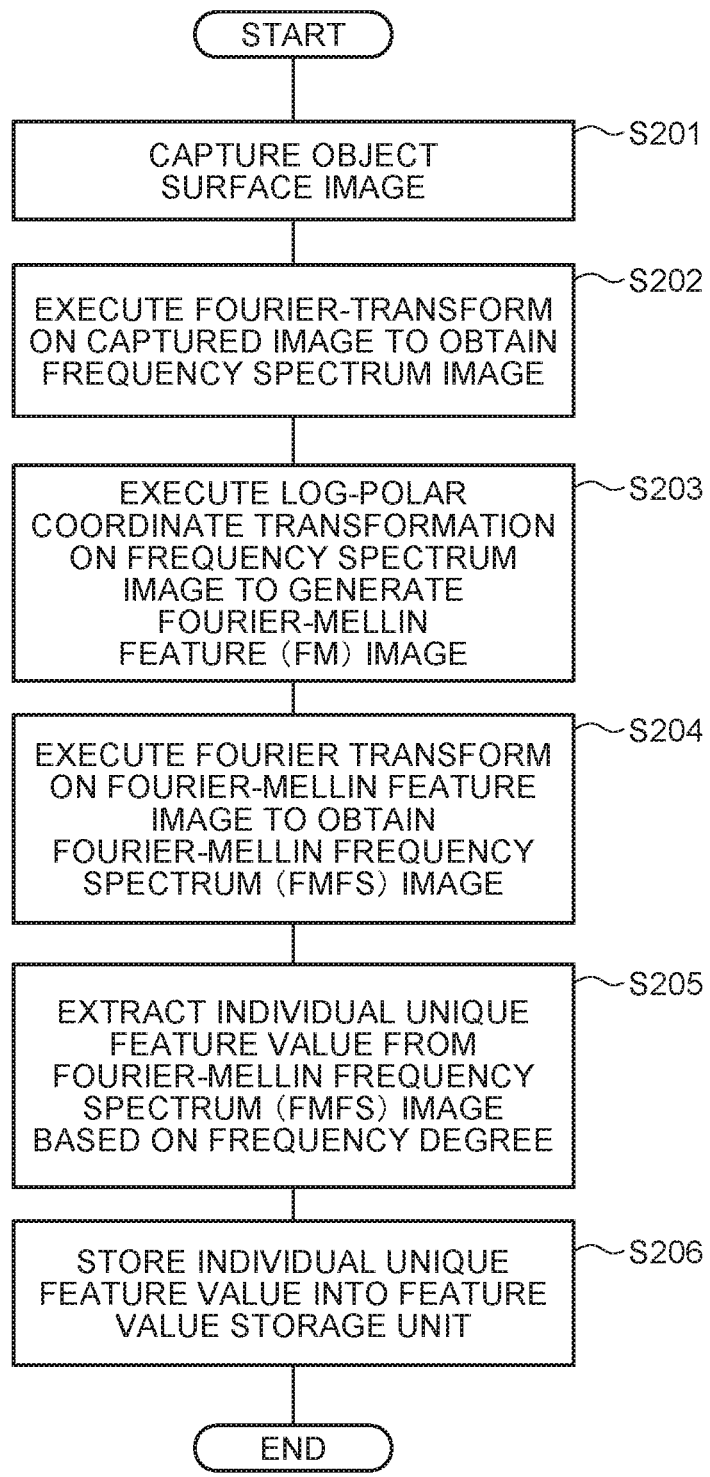
FIG. 21 is a flowchart showing an example of an individual registration process in the individual identification device according to the second example embodiment of the present invention.

FIGS. 20 and 21 are a process flow and a flowchart of the individual registration operation. First, the image acquisition unit 101 acquires an image obtained by capturing the surface of an object that is the target of individual registration (step S201). Next, the frequency transformation unit 103 executes frequency transformation on the captured image acquired by the image acquisition unit 101 to generate a frequency spectrum image (step S202). Next, the polar coordinate transformation unit 104 executes log-polar coordinate transformation on the frequency spectrum image generated by the frequency transformation unit 103 to generate a Fourier-Mellin feature (FM) image (step S203). Next, the frequency transformation unit 105 executes frequency transformation on the FM image generated by the polar coordinate transformation unit 104 to generate a Fourier-Mellin frequency spectrum (FMFS) image (step S204). These processes are the same as in preprocessing for effectiveness degree decision.

Next, the feature extraction unit 108 inputs the FMFS image and the degree of effectiveness for each partial area stored in the effectiveness degree storage unit 107. In a case where a degree of effectiveness for each production line is stored in the effectiveness degree storage unit 107 as shown in FIG. 19B, the feature extraction unit 108 uses a degree of effectiveness corresponding to a production line where an individual registration target product has been produced. For example, when an individual registration target product has been produced on the first production line, the feature extraction unit 108 uses the effectiveness degree $CF_1$. Next, the feature extraction unit 108 cuts out a partial image from the FMFS image based on the input effectiveness degree, and outputs the cut-out image as an individual unique feature value (step S205). That is, the feature extraction unit 108 divides the FMFS image into partial areas, and cuts out a set of partial areas whose degrees of effectiveness is 1 as a partial image. Moreover, in a case where a weight coefficient is added to the degree of effectiveness, the feature extraction unit 108 multiplies each frequency component of a partial area by the weight coefficient, and thereafter outputs as the individual unique feature value.

Next, the feature value storage unit 109 stores the feature value unique to the registration target individual obtained by the feature extraction unit 108 (step S206). At this time, the feature value storage unit 109 links (associates) the individual unique feature value with information (also referred to as supplementary information) relating to the registration target product, such as the ID number, registration time and date, dimensions, product specification, and so on of the registration target individual. Consequently, it becomes possible to present individual management information of a product based on the result of judgment at the time of individual identification or individual authentication to be described later.

Figure 22:
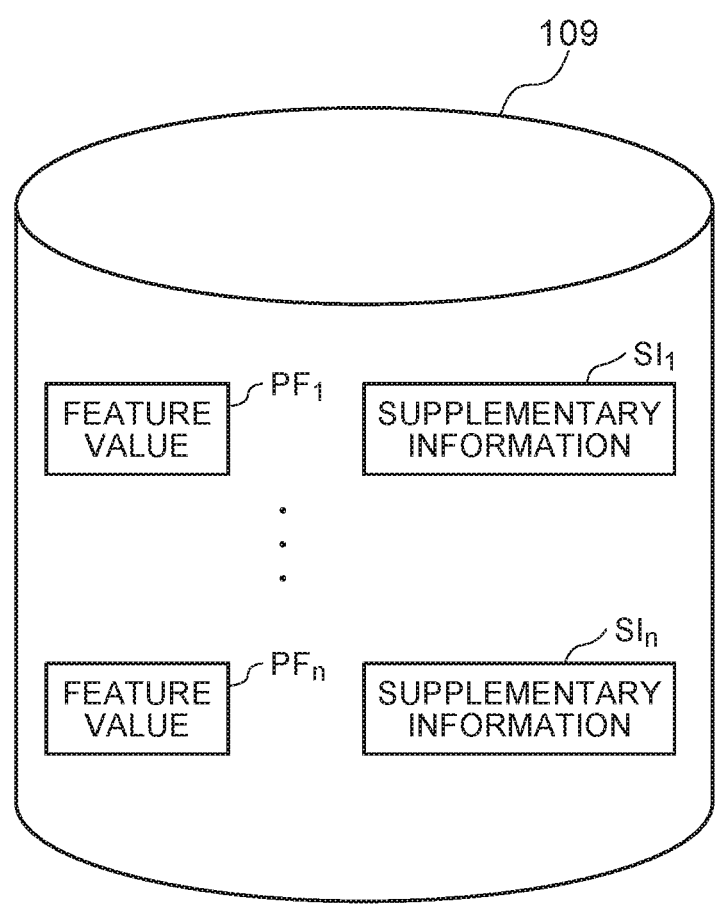
FIG. 22 is a view showing an example of the content of a feature value storage unit in the individual identification device according to the second example embodiment of the present invention.

FIG. 22 shows an example of the content of the feature value storage unit 109. Feature values $PF_1, \ldots, PE_n$ and supplementary information $SI_1, \ldots, SI_n$ are feature values and supplementary information that correspond one-to-one to a registration target individual.

[Individual Identification and Individual Collation Operation]

Next, an operation of identifying and collating each object to be managed will be described.

Figure 23:
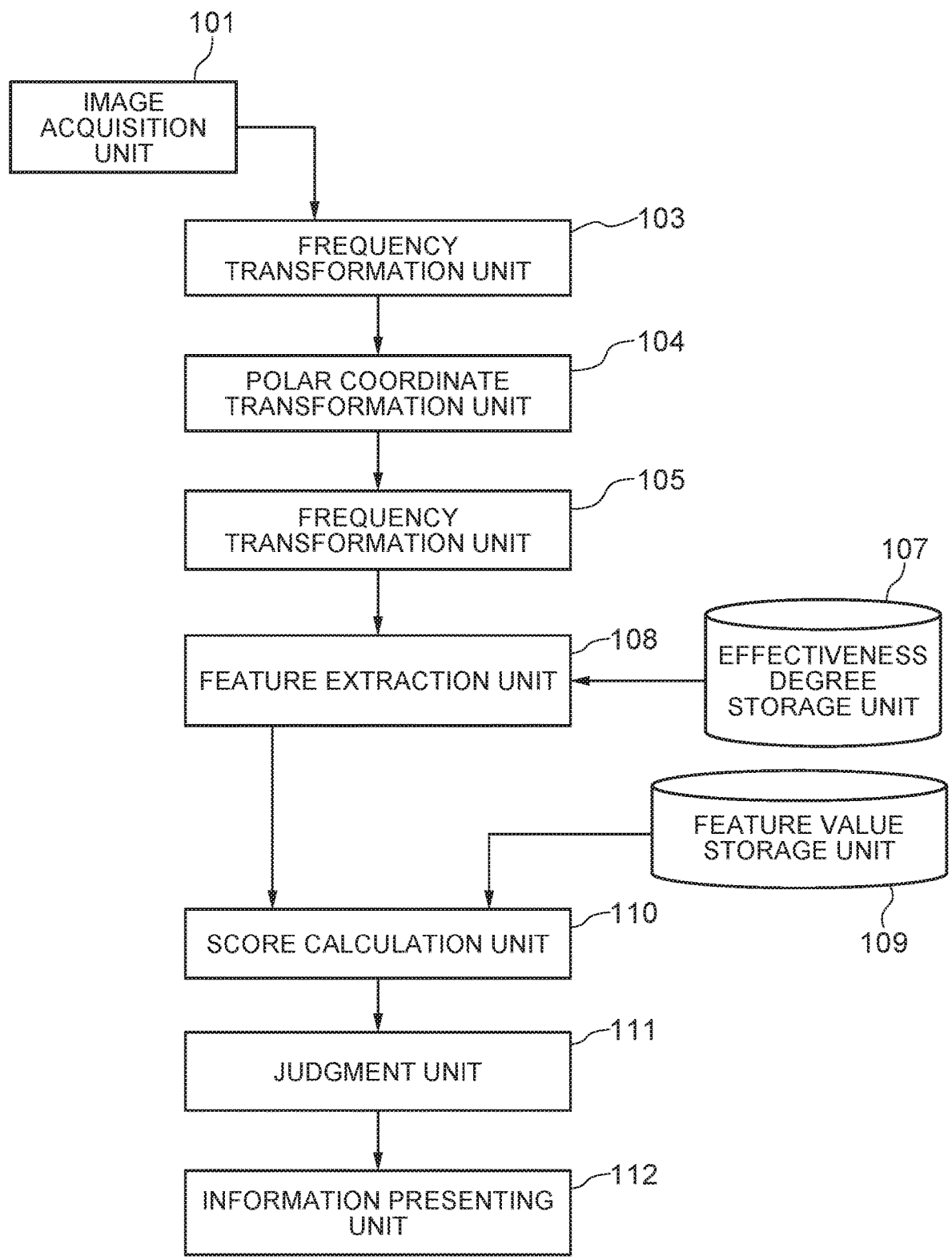
FIG. 23 is an operation flow diagram at the time of individual identification and individual collation in the individual identification device according to the second example embodiment of the present invention.
Figure 24:
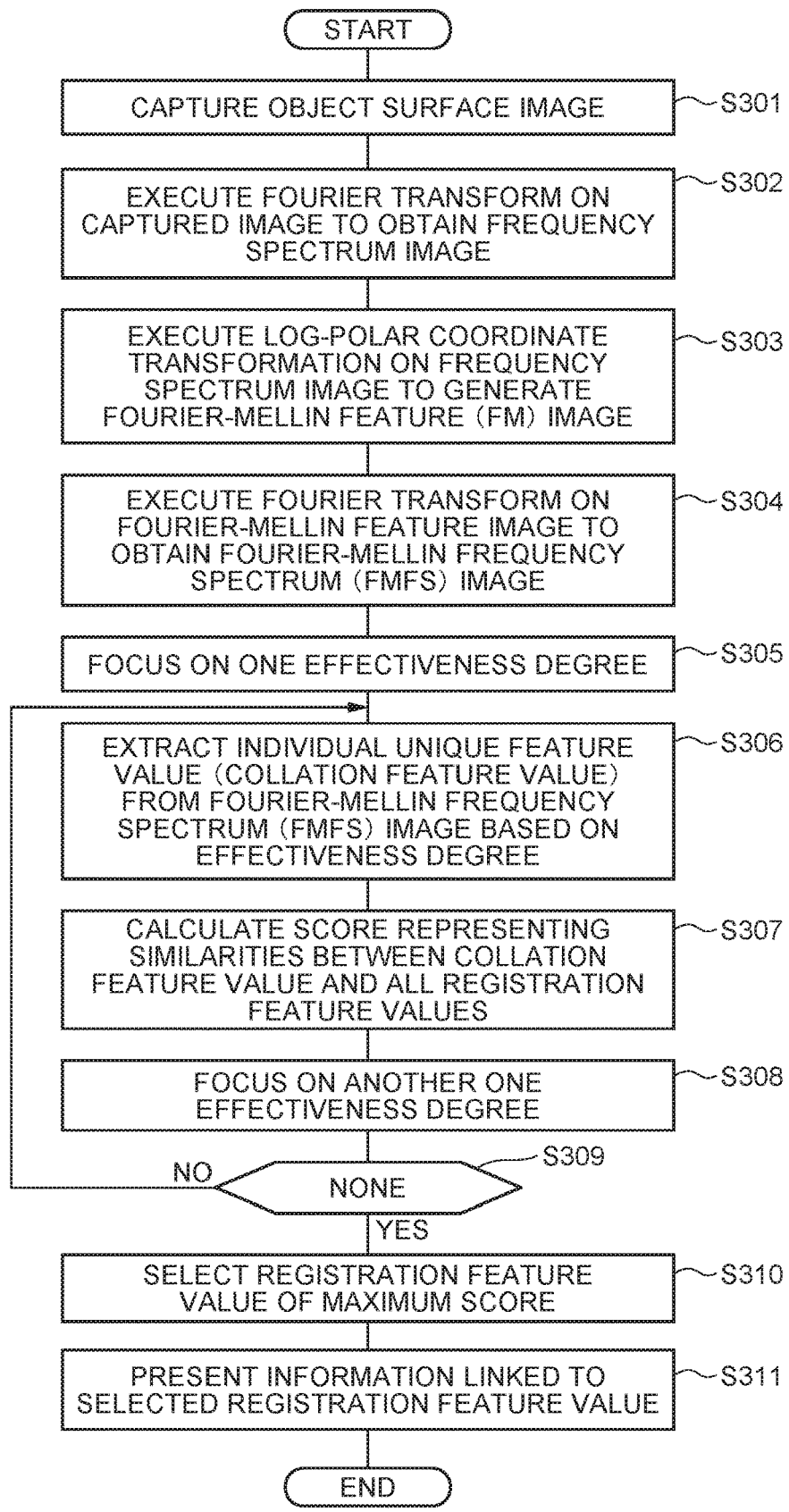
FIG. 24 is a flowchart showing an example of a process of individual identification and individual collation in the individual identification device according to the second example embodiment of the present invention.

FIGS. 23 and 24 are a process flow and a flowchart of an operation at the time of individual identification and individual collation. First, the image acquisition unit 101 acquires an image obtained by capturing the surface of an object to be identified and collated (hereinafter, the image will be referred to as a collated image) (step S301). Next, the frequency transformation unit 103 executes frequency transformation on the collated image to generate a frequency spectrum image (step S302). Next, the polar coordinate transformation unit 104 executes log-polar coordinate transformation on the frequency spectrum image generated by the frequency transformation unit 103 to generate a Fourier-Mellin feature (FM) image (step S303). Next, the frequency transformation unit 105 executes frequency transformation on the FM image generated by the polar coordinate transformation unit 104 to generate a Fourier-Mellin frequency spectrum (FMFS) image (step S304). The processes of steps S301 to S304 are the same as the processes of steps S201 to S204 of FIG. 21 in the individual registration operation. Hereinafter, the Fourier-Mellin frequency spectrum (FMFS) image obtained by the frequency transformation unit 105 will be referred to as a collated FMFS image.

Next, the feature extraction unit 108 focuses on one of the degrees of effectiveness stored in the effectiveness degree storage unit 107 (step S305). For example, in a case where one kind of effectiveness degree CF is stored in the effectiveness degree storage unit 107 as shown in FIG. 19A, the feature extraction unit 108 focuses on the effectiveness degree CF. On the other hand, in a case where multiple kinds of effectiveness degrees are stored in the effectiveness degree storage unit 107 as shown in FIG. 19B, the feature extraction unit 108 focuses on one of the effectiveness degrees.

Next, the feature extraction unit 108 cuts out a partial image from the collated FMFS image based on the focused degree of effectiveness, and outputs the cut-out image as an individual unique feature value to be identified and collated (step S306). That is, the feature extraction unit 108 divides the collated FMFS image into partial areas and cuts out a set of partial areas whose degrees of effectiveness are 1, as a partial image. Moreover, in a case where a weight coefficient is added to the degree of effectiveness, the feature extraction unit 108 multiplies each frequency component of the partial area by the weight coefficient, and thereafter outputs as an individual unique feature value. Hereinafter, the individual unique feature value will be referred to as a collated feature value.

Next, the score calculation unit 110 executes, for each individual unique feature value stored in the feature value storage unit 109 (hereinafter, the individual unique value will be referred to as a registered feature value), calculation of the element-wise product of the collated feature value obtained by the feature extraction unit 108 and the registered feature value (generation of a partial cross power spectrum), generation of all cross power spectrums by zero-padding of the other partial area, calculation of a correlation value map by inverse Fourier transform on all the cross power spectrums, and calculation of the presence/absence of the maximum value peak on the correlation value map and the evaluation value of sharpness of the peak, and finally derives a score indicating the similarity between the collated feature value and the registered feature value as a numerical value (step S307). In the abovementioned score calculation, for example, the score calculation unit 110 calculates a correlation between two FMFS feature values of the collated feature value and the registered feature value, sets the degree of misalignment obtained by executing inverse Fourier transform on the correlation as a value indicating the sharpness of the peak on the correlation value map, and sets the value indicating the sharpness of the peak as a score between the collated feature value and the registered feature value. To be specific, the score calculation unit 110 may set the S/N ratio of the peak value and the surrounding area as the score, or may set the ratio of the maximum value and the second-place value in the correlation map as the score. Alternatively, the score calculation unit 110 may calculate a z score of the maximum value from the elements around the maximum value, or may execute any linear transformation on the peak value or the z score and normalize the score so that it is included within a certain value range.

Next, the score calculation unit 110 focuses on another one of the effectiveness degrees stored in the effectiveness degree storage unit 107 (step S308). When there is no effectiveness degree to be focused on, the score calculation unit 110 proceeds to a process of step S310. When there is another effectiveness degree to be focused on, the score calculation unit 110 focuses on the effectiveness degree and returns to step S306, and executes the same process as described above on the newly focused effectiveness degree. Consequently, in a case where multiple effectiveness degrees corresponding one-to-one to production lines are stored in the effectiveness degree storage unit 107 as shown in FIG. 19B, the processes of steps S306 and S307 are executed by the number of production lines.

At step S310, the judgment unit 111 judges which registered feature value the collated feature value matches among the registered feature values stored in the feature value storage unit 109 based on the score calculated by the score calculation unit 111 at step S307. For example, the judgment unit 111 sorts scores between the collated feature value and the respective registered feature values stored in the feature value storage unit 109, and selects the registered feature value that the score with the collated feature value becomes the maximum (normalized cross-correlation becomes the maximum). Then, the judgment unit 111 retrieves supplementary information linked to the selected registered feature value from the feature value storage unit 109, and outputs the information as product information of the product to be identified and collated.

Further, the judgment unit 111 may judge whether the maximum score between the collated feature value and the registered feature value exceeds a preset judgment threshold value. Then, in a case where the maximum score between the collated feature value and the registered feature value does not exceed the judgment threshold value, the judgment unit 111 determines that the product to be identified and collated is not registered, and outputs information indicating an authentication error. The judgment unit 111 thus operating can be used for the purpose of individual authentication such as authenticity determination of a management target.

Subsequently, the information presenting unit 112 receives the product information and the authentication error information obtained from the judgment unit 111, and displays the product information that is the result of individual identification of the product to be identified and collated and individual authentication information on a display device (not shown) or outputs the information to an external terminal (step S311).

Effect of This Example Embodiment

According to this example embodiment, it is possible to perform individual identification with a less amount of processing without executing the process of aligning and collating images obtained by capturing an object on a large number of individuals to be collated. This is because in order to eliminate a feature common to different individuals of a FM image that is a feature value invariant to misalignment of the collated image and the registered image, the score calculation unit 110 performs individual identification without alignment, by using a fact that the amount of misalignment, namely, a correlation peak can be obtained only in the same individuals while a correlation peak cannot be obtained in different individuals, based on a partial area in a FMFS image that is a frequency spectrum of the FM image (in this example embodiment, an individual unique frequency spectrum component that is not common to multiple individuals).

Although the present invention has been described above referring to the example embodiments, the present invention is not limited to the above example embodiments. The configuration and details of the present invention can be changed in various manners that can be understood by one skilled in the art within the scope of the present invention.

The present invention is based upon and claims the benefit of priority from Japanese patent application No. 2017-194925, filed on Oct. 5, 2017, the disclosure of which is incorporated herein in its entirety by reference.

INDUSTRIAL APPLICABILITY

The present invention can be used in the field of individual identification and management for each product by acquiring a fine pattern difference naturally caused in the course of the same production process of fine irregularities or a pattern of the product surface, a random pattern of the material surface, or the like, as an image with an image capturing device such as a camera, and then recognizing the fine patterns.

The whole or part of the example embodiments disclosed above can be described as, but not limited to, the following supplementary notes.

(Supplementary Note 1)

An individual identification device comprising:

a decision unit configured to decide, for each partial area, a degree of effectiveness relating to calculation of a score representing a similarity between a registered image obtained by capturing an object to be registered and a collated image obtained by capturing an object to be collated, based on whether or not the partial area contains an image component common to a plurality of registered images obtained by capturing a plurality of objects to be registered; and a calculation unit configured to calculate the score based on image components contained in the registered image and the collated image and on the degrees of effectiveness.

(Supplementary Note 2)

The individual identification device according to Supplementary Note 1, wherein the registered image and the collated image are frequency spectrum images obtained by executing frequency transformation, log-polar coordinate transformation, and frequency transformation on images obtained by capturing the object to be registered and the object to be collated, respectively.

(Supplementary Note 3)

The individual identification device according to Supplementary Note 1 or 2, wherein the calculation unit includes:

a registered image preprocessing part configured to extract one or some of partial areas from the registered image based on the degree of effectiveness and generate a registered-image partial image;

a collated image preprocessing part configured to extract one or some of partial areas from the collated image based on the degree of effectiveness and generate a collated-image partial image;

a partial cross power spectrum generation part configured to generate a partial cross power spectrum that is a cross power spectrum between the registered-image partial image and the collated-image partial image;

an element filling part configured to generate an entire cross power spectrum by filling zero as a cross power spectrum of an image portion except the partial images into the partial cross power spectrum;

an inverse frequency transformation part configured to generate a correlation value map by executing inverse frequency transformation on the entire cross power spectrum; and a score calculation part configured to calculate the score from the correlation value map.

(Supplementary Note 4)

The individual identification device according to Supplementary Note 1 or 2, wherein the calculation unit includes:

a registered image preprocessing part configured to generate a post-change registered image obtained by changing a value of an image component of a partial area of the registered image in accordance with the degree of effectiveness of the partial area;

a collated image preprocessing part configured to generate a post-change collated image obtained by changing a value of an image component of a partial area of the collated image in accordance with the degree of effectiveness of the partial area;

a cross power spectrum generation part configured to generate a cross power spectrum between the post-change registered image and the post-change collated image;

an inverse frequency transformation part configured to generate a correlation value map by executing inverse frequency transformation on the cross power spectrum; and a score calculation part configured to calculate the score from the correlation value map.

(Supplementary Note 5)

The individual identification device according to any of Supplementary Notes 1 to 4, further comprising a judgment unit configured to judge a result of collation between the registered image and the collated image based on the calculated score.

(Supplementary Note 6)

The individual identification device according to any of Supplementary Notes 1 to 5, further comprising a threshold value decision unit configured to decide a judgment threshold value for comparison with the score, wherein the threshold value decision unit generates, for each of the registered images, a collated image approximate to the registered image, uses the calculation unit to calculate a first score representing a similarity between the collated image and the registered image and a second score representing a similarity between the collated image and another of the registered images, and decides the judgment threshold value based on the first score and the second score.

(Supplementary Note 7)

The individual identification device according to any of Supplementary Notes 1 to 6, wherein:

the decision unit is configured to generate a plurality of image pairs each obtained by capturing mutually different objects to be registered and, for each of the generated image pairs, calculate a first correlation value between image components of corresponding partial areas, generate a plurality of image pairs each obtained by capturing same objects to be registered and, for each of the generated image pairs, calculate a second correlation value between image components of corresponding partial areas, and decide the degree of effectiveness of each partial area based on the first correlation value and the second correlation value.

(Supplementary Note 8)

The individual identification device according to Supplementary Note 7, wherein the decision unit is configured to decide the degree of effectiveness of each partial area based on a ratio of the second correlation value to the first correlation value.

(Supplementary Note 9)

The individual identification device according to any of Supplementary Notes 1 to 8, wherein the decision unit is configured to, based on whether or not the partial area contains an image component common to a plurality of registered images obtained by capturing a plurality of objects to be registered produced on a same production line, decide the degree of effectiveness corresponding to the production line on a one-to-one basis.

(Supplementary Note 10)

An individual identification method comprising:

deciding, for each partial area, a degree of effectiveness relating to calculation of a score representing a similarity between a registered image obtained by capturing an object to be registered and a collated image obtained by capturing an object to be collated, based on whether or not the partial area contains an image component common to a plurality of registered images obtained by capturing a plurality of objects to be registered; and calculating the score based on image components contained in the registered image and the collated image and on the degrees of effectiveness.

(Supplementary Note 11)

The individual identification method according to Supplementary Note 10, wherein the registered image and the collated image are frequency spectrum images obtained by executing frequency transformation, log-polar coordinate transformation, and frequency transformation on images obtained by capturing the object to be registered and the object to be collated, respectively.

(Supplementary Note 12)

The individual identification method according to Supplementary Note 10 or 11, wherein in calculation of the score:

one or some of partial areas are extracted from the registered image based on the degree of effectiveness, and a registered-image partial image is generated;

one or some of partial areas are extracted from the collated image based on the degree of effectiveness, and a collated-image partial image is generated;

a partial cross power spectrum that is a cross power spectrum between the registered-image partial image and the collated-image partial image is generated;

an entire cross power spectrum is generated by filling zero as a cross power spectrum of an image portion except the partial images into the partial cross power spectrum;

a correlation value map is generated by executing inverse frequency transformation on the entire cross power spectrum; and the score is calculated from the correlation value map.

(Supplementary Note 13)

The individual identification method according to Supplementary Note 10 or 11, wherein in calculation of the score:

a post-change registered image is generated by changing a value of an image component of a partial area of the registered image in accordance with the degree of effectiveness of the partial area;

a post-change collated image is generated by changing a value of an image component of a partial area of the collated image in accordance with the degree of effectiveness of the partial area;

a cross power spectrum between the post-change registered image and the post-change collated image is generated;

a correlation value map is generated by executing inverse frequency transformation on the cross power spectrum; and the score is calculated from the correlation value map.

(Supplementary Note 14)

The individual identification method according to any of Supplementary Notes 10 to 13, further comprising judging a result of collation between the registered image and the collated image based on the calculated score.

(Supplementary Note 15)

The individual identification method according to any of Supplementary Notes 10 to 14, further comprising deciding a judgment threshold value for comparison with the score, wherein in decision of the judgment threshold, for each of the registered images, a collated image approximate to the registered image is generated, a first score representing a similarity between the collated image and the registered image and a second score representing a similarity between the collated image and another of the registered images are calculated, and the judgment threshold value is decided based on the first score and the second score.

(Supplementary Note 16)

The individual identification method according to any of Supplementary Notes 10 to 15, wherein in decision of the degree of effectiveness:

a plurality of image pairs each obtained by capturing mutually different objects to be registered are generated and, for each of the generated image pairs, a first correlation value between image components of corresponding partial areas is calculated, a plurality of image pairs each obtained by capturing same objects to be registered are generated and, for each of the generated image pairs, a second correlation value between image components of corresponding partial areas is calculated, and the degree of effectiveness of each partial area is decided based on the first correlation value and the second correlation value.

(Supplementary Note 17)

The individual identification method according to Supplementary Note 16, wherein in decision of the degree of effectiveness, the degree of effectiveness of each partial area is decided based on a ratio of the second correlation value to the first correlation value.

(Supplementary Note 18)

The individual identification method according to any of Supplementary Notes 10 to 17, wherein in decision of the degree of effectiveness, based on whether or not the partial area contains an image component common to a plurality of registered images obtained by capturing a plurality of objects to be registered produced on a same production line, the degree of effectiveness corresponding to the production line on a one-to-one basis is decided.

(Supplementary Note 19)

A program comprising instructions for causing a computer to function as:

a decision unit configured to decide, for each partial area, a degree of effectiveness relating to calculation of a score representing a similarity between a registered image obtained by capturing an object to be registered and a collated image obtained by capturing an object to be collated, based on whether or not the partial area contains an image component common to a plurality of registered images obtained by capturing a plurality of objects to be registered; and a calculation unit configured to calculate the score based on image components contained in the registered image and the collated image and on the degrees of effectiveness.

DESCRIPTION OF NUMERALS 1 individual identification device
2 calculation unit
2-1 registered image preprocessing part
2-1A registered image preprocessing part
2-2 collated image preprocessing part
2-2A collated image processing part
2-3 partial cross power spectrum generation part
2-3 cross power spectrum generation part
2-4 element filling part
2-5 inverse Fourier transform part
2-6 score calculation part
3 decision part
4-1 registered image
4-2 registered image
4-3 registered image
4-4 registered image
4A partial image of registered image
4B post-change registered image
5 effectiveness degree
6 collated image
6A partial image of collated image
6B post-change collated image
7 cross power spectrum
7A partial cross power spectrum
7B cross power spectrum
8 correlation value map
100 individual identification device
101 image acquisition unit
102 image storage unit
103 frequency transformation unit
104 power coordinate transformation unit
105 frequency transformation unit
106 effectiveness degree decision unit
107 effectiveness degree storage unit
108 feature extraction unit
109 feature value storage unit
110 score calculation unit
111 judgment unit
112 information presenting unit
200 information processing device
201 image capturing part
202 operation input part
203 screen display part
204 communication interface part
205 storage part
206 arithmetic processing part

The invention claimed is:

1. An individual identification device comprising:
a memory including program instructions; and
a processor coupled to the memory,
wherein the processor is configured to execute the program instructions to:
decide, for each partial area, a degree of effectiveness relating to calculation of a score representing a similarity between a registered image obtained by capturing an object to be registered and a collated image obtained by capturing an object to be collated, based on whether or not the partial area contains an image component common to a plurality of registered images obtained by capturing a plurality of objects to be registered; and
calculate the score based on image components contained in the registered image and the collated image and on the degrees of effectiveness, wherein
wherein in calculation of the score:
one or some of partial areas are extracted from the registered image based on the degree of effectiveness and a registered-image partial image is generated;
one or some of partial areas are extracted from the collated image based on the degree of effectiveness and a collated-image partial image is generated;

a partial cross power spectrum that is a cross power spectrum between the registered-image partial image and the collated-image partial image is generated;

an entire cross power spectrum is generated by filling zero as a cross power spectrum of an image portion except the partial images into the partial cross power spectrum;

a correlation value map is generated by executing inverse frequency transformation on the entire cross power spectrum; and calculate the score is calculated from the correlation value map.

2. The individual identification device according to claim 1, wherein the registered image and the collated image are frequency spectrum images obtained by executing frequency transformation, log-polar coordinate transformation, and frequency transformation in this order on images obtained by capturing the object to be registered and the object to be collated, respectively.

3. An individual identification device comprising:
a memory including program instructions; and
a processor coupled to the memory,
wherein the processor is configured to execute the program instructions to:
decide, for each partial area, a degree of effectiveness relating to calculation of a score representing a similarity between a registered image obtained by capturing an object to be registered and a collated image obtained by capturing an object to be collated, based on whether or not the partial area contains an image component common to a plurality of registered images obtained by capturing a plurality of objects to be registered; and calculate the score based on image components contained in the registered image and the collated image and on the degrees of effectiveness, wherein in calculation of the score:

a post-change registered image obtained by changing a value of an image component of a partial area of the registered image in accordance with the degree of effectiveness of the partial area is generated;

a post-change collated image obtained by changing a value of an image component of a partial area of the collated image in accordance with the degree of effectiveness of the partial area is generated;

a cross power spectrum between the post-change registered image and the post-change collated image is generated;

a correlation value map is generated by executing inverse frequency transformation on the cross power spectrum; and the score is calculated from the correlation value map.

4. The individual identification device according to claim 1, wherein the processor is further configured to judge a result of collation between the registered image and the collated image based on the calculated score.

5. The individual identification device according to claim 1, wherein:
the processor is further configured to decide a judgment threshold value for comparison with the score; and
in decision of the judgment threshold value, for each of the registered images, a collated image approximate to the registered image is generated, a first score representing a similarity between the collated image and the registered image and a second score representing a similarity between the collated image and another of the registered images are calculated, and the judgment threshold value is decided based on the first score and the second score.

6. The individual identification device according to claim 1, wherein in decision of the degree of effectiveness:
a plurality of image pairs each obtained by capturing mutually different objects to be registered are generated and, for each of the generated image pairs, a first correlation value between image components of corresponding partial areas is calculated; a plurality of image pairs each obtained by capturing same objects to be registered are generated and, for each of the generated image pairs, a second correlation value between image components of corresponding partial areas is calculated; and
the degree of effectiveness of each partial area is decided based on the first correlation value and the second correlation value.

7. The individual identification device according to claim 6, wherein in decision of the degree of effectiveness, the degree of effectiveness of each partial area is decided based on a ratio of the second correlation value to the first correlation value.

8. The individual identification device according to claim 1, wherein in decision of the degree of effectiveness, based on whether or not the partial area contains an image component common to a plurality of registered images obtained by capturing a plurality of objects to be registered produced on a same production line, the degree of effectiveness corresponding to the production line on a one-to-one basis is decided.

9. An individual identification method comprising:
deciding, for each partial area, a degree of effectiveness relating to calculation of a score representing a similarity between a registered image obtained by capturing an object to be registered and a collated image obtained by capturing an object to be collated, based on whether or not the partial area contains an image component common to a plurality of registered images obtained by capturing a plurality of objects to be registered; and calculating the score based on image components contained in the registered image and the collated image and on the degrees of effectiveness, wherein in calculation of the score:

one or some of partial areas are extracted from the registered image based on the degree of effectiveness, and a registered-image partial image is generated;

one or some of partial areas are extracted from the collated image based on the degree of effectiveness, and a collated-image partial image is generated;

a partial cross power spectrum that is a cross power spectrum between the registered-image partial image and the collated-image partial image is generated;

an entire cross power spectrum is generated by filling zero as a cross power spectrum of an image portion except the partial images into the partial cross power spectrum;

a correlation value map is generated by executing inverse frequency transformation on the entire cross power spectrum; and the score is calculated from the correlation value map.

10. The individual identification method according to claim 9, wherein the registered image and the collated image are frequency spectrum images obtained by executing frequency transformation, log-polar coordinate transformation, and frequency transformation on images obtained by capturing the object to be registered and the object to be collated, respectively.

11. An individual identification method comprising:
deciding, for each partial area, a degree of effectiveness relating to calculation of a score representing a similarity between a registered image obtained by capturing an object to be registered and a collated image obtained by capturing an object to be collated, based on whether or not the partial area contains an image component common to a plurality of registered images obtained by capturing a plurality of objects to be registered; and
calculating the score based on image components contained in the registered image and the collated image and on the degrees of effectiveness, wherein in calculation of the score:
a post-change registered image is generated by changing a value of an image component of a partial area of the registered image in accordance with the degree of effectiveness of the partial area;
a post-change collated image is generated by changing a value of an image component of a partial area of the collated image in accordance with the degree of effectiveness of the partial area;
a cross power spectrum between the post-change registered image and the post-change collated image is generated;
a correlation value map is generated by executing inverse frequency transformation on the cross power spectrum; and
the score is calculated from the correlation value map.

12. The individual identification method according to claim 9, further comprising judging a result of collation between the registered image and the collated image based on the calculated score.

13. The individual identification method according to claim 9, further comprising deciding a judgment threshold value for comparison with the score,
wherein in decision of the judgment threshold, for each of the registered images, a collated image approximate to the registered image is generated, a first score representing a similarity between the collated image and the registered image and a second score representing a similarity between the collated image and another of the registered images are calculated, and the judgment threshold value is decided based on the first score and the second score.

14. The individual identification method according to claim 9, wherein in decision of the degree of effectiveness:
a plurality of image pairs each obtained by capturing mutually different objects to be registered are generated and, for each of the generated image pairs, a first correlation value between image components of corresponding partial areas is calculated,
a plurality of image pairs each obtained by capturing same objects to be registered are generated and, for each of the generated image pairs, a second correlation value between image components of corresponding partial areas is calculated, and
the degree of effectiveness of each partial area is decided based on the first correlation value and the second correlation value.

15. The individual identification method according to claim 14, wherein in decision of the degree of effectiveness, the degree of effectiveness of each partial area is decided based on a ratio of the second correlation value to the first correlation value.

16. The individual identification method according to claim 9, wherein in decision of the degree of effectiveness, based on whether or not the partial area contains an image component common to a plurality of registered images obtained by capturing a plurality of objects to be registered produced on a same production line, the degree of effectiveness corresponding to the production line on a one-to-one basis is decided.

17. A non-transitory computer-readable medium having stored thereon a program comprising instructions for causing a computer to:
decide, for each partial area, a degree of effectiveness relating to calculation of a score representing a similarity between a registered image obtained by capturing an object to be registered and a collated image obtained by capturing an object to be collated, based on whether or not the partial area contains an image component common to a plurality of registered images obtained by capturing a plurality of objects to be registered; and
calculate the score based on image components contained in the registered image and the collated image and on the degrees of effectiveness, wherein in calculation of the score:
one or some of partial areas are extracted from the registered image based on the degree of effectiveness, and a registered-image partial image is generated;
one or some of partial areas are extracted from the collated image based on the degree of effectiveness, and a collated-image partial image is generated;
a partial cross power spectrum that is a cross power spectrum between the registered-image partial image and the collated-image partial image is generated;
an entire cross power spectrum is generated by filling zero as a cross power spectrum of an image portion except the partial images into the partial cross power spectrum;
a correlation value map is generated by executing inverse frequency transformation on the entire cross power spectrum; and
the score is calculated from the correlation value map.

* * * * *